United States Patent
Khosravy et al.

(10) Patent No.: US 7,756,825 B2
(45) Date of Patent: Jul. 13, 2010

(54) SYNCHRONIZATION PEER PARTICIPANT MODEL

(75) Inventors: Moe Khosravy, Kirkland, WA (US);
Jorg-Thomas Pfenning, Redmond, WA (US); Lev Novik, Bellevue, WA (US);
Marc Levy, Woodinville, WA (US);
Michael S. Beckerman, Bellevue, WA (US); Myron C. Thomas, Newcastle, WA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 11/354,677

(22) Filed: Feb. 15, 2006

(65) Prior Publication Data
US 2006/0215569 A1   Sep. 28, 2006

Related U.S. Application Data

(63) Continuation-in-part of application No. 10/631,591, filed on Jul. 31, 2003.

(51) Int. Cl.
G06F 17/30 (2006.01)

(52) U.S. Cl. ..................... 707/611; 707/612

(58) Field of Classification Search ............. 707/611, 707/612
See application file for complete search history.

(56) References Cited

U.S. PATENT DOCUMENTS

| | | | | |
|---|---|---|---|---|
| 4,078,260 | A * | 3/1978 | Chen et al. | 1/1 |
| 5,185,886 | A * | 2/1993 | Edem et al. | 1/1 |
| 5,893,116 | A * | 4/1999 | Simmonds et al. | 1/1 |
| 6,189,007 | B1 * | 2/2001 | Boonie et al. | 1/1 |
| 6,240,416 | B1 | 5/2001 | Immon et al. | |
| 6,243,715 | B1 * | 6/2001 | Bogantz et al. | 1/1 |
| 6,401,104 | B1 * | 6/2002 | LaRue et al. | 707/203 |
| 6,493,720 | B1 | 12/2002 | Chu et al. | |
| 6,507,845 | B1 * | 1/2003 | Cohen et al. | 1/1 |
| 6,560,614 | B1 * | 5/2003 | Barboy et al. | 1/1 |
| 6,873,987 | B1 * | 3/2005 | Novaes et al. | 1/1 |
| 6,876,995 | B1 * | 4/2005 | Sinclair et al. | 1/1 |

(Continued)

FOREIGN PATENT DOCUMENTS

EP   1267283 A2   12/2002

OTHER PUBLICATIONS

"Open Mobile Alliance SyncML Materials from Affiliates" [http://www.openmobilealliance.org/tech/affiliates/syncml/syncmlindex.html].

(Continued)

Primary Examiner—Don Wong
Assistant Examiner—Kim T Nguyen

(57) ABSTRACT

Various technologies and techniques are disclosed that improve synchronization of data between varying types of devices and/or services. A full participant receives a request from another participant to perform a synchronization operation. The synchronization engine determines whether the device or service is a full, partial, or simple participant. The device or service is a simple participant if it has a data store for synchronized data and no knowledge store. The device or service is a partial participant if it has a data store for synchronized data and a knowledge store, but does not understand the knowledge. The device or service is a full participant type if it has a data store for synchronized data and a knowledge store and understands the knowledge. The synchronization engine performs the synchronization operation with the device or service using a set of logic that is appropriate for the type of device or service.

19 Claims, 21 Drawing Sheets

U.S. PATENT DOCUMENTS

| | | | |
|---|---|---|---|
| 6,928,467 B2 * | 8/2005 | Peng | 709/219 |
| 2002/0133508 A1 * | 9/2002 | LaRue et al. | 707/202 |
| 2005/0027755 A1 | 2/2005 | Shah | |
| 2005/0044187 A1 | 2/2005 | Jhaveri et al. | |
| 2005/0086272 A1 | 4/2005 | Novik et al. | |
| 2005/0125621 A1 | 6/2005 | Shah | |
| 2005/0198453 A1 | 9/2005 | Osaki | |
| 2005/0235019 A1 | 10/2005 | Yang | |

OTHER PUBLICATIONS

"SyncML Representation Protocol version 1.0.1" (Jun. 15, 2001) [www.openmobilealliance.org/tech/affiliates/syncml/syncml_represent_v101_20010615.pdf].

"Apple.Mac Features" [http://www.apple.com/dotmac/features/html].

International Search Report, Application No. PCT/US2007/001394, dated Jan. 19, 2007 (8 pages).

* cited by examiner

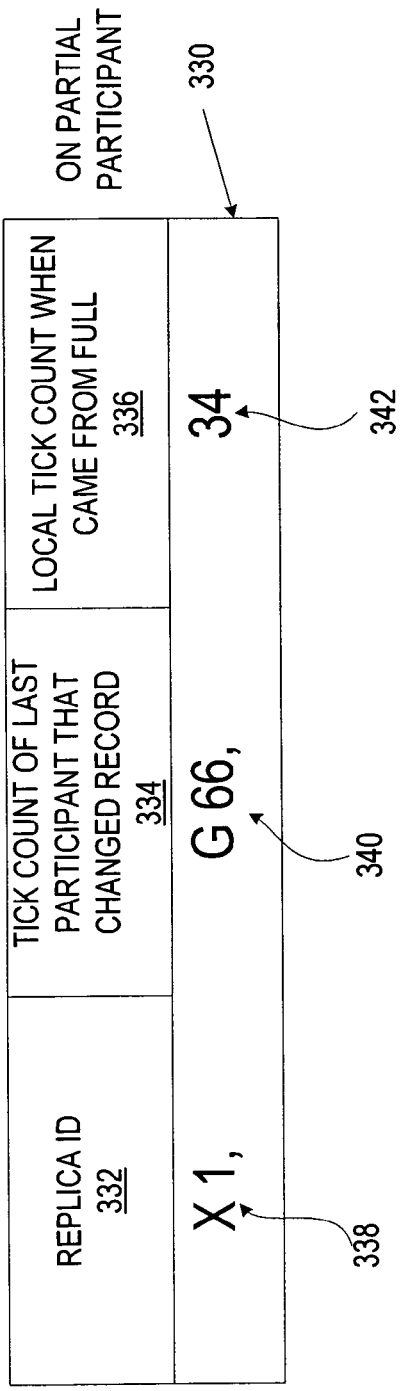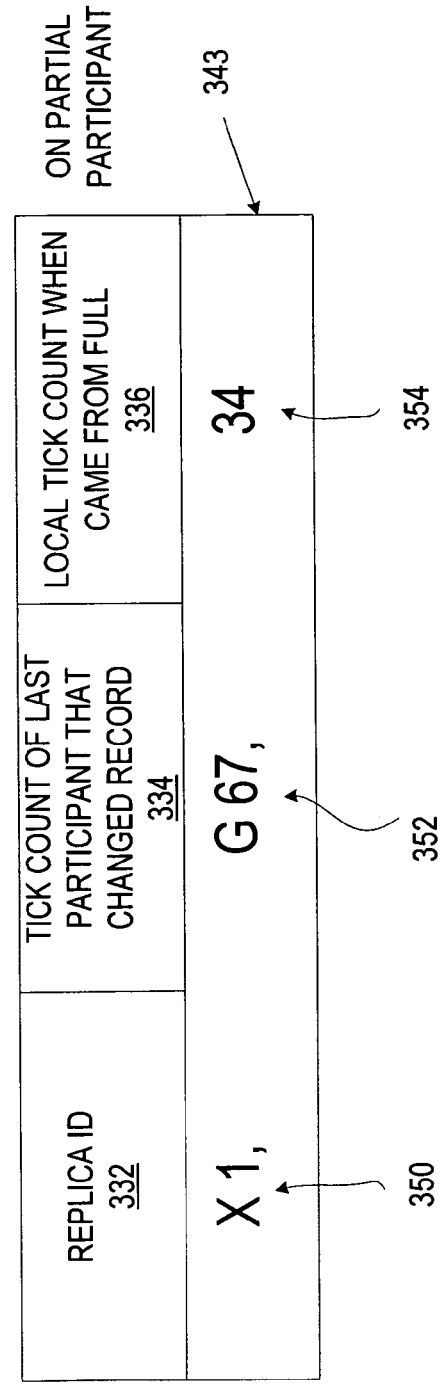

FIG. 12

| REPLICA ID 362 | TICK COUNT OF LAST PARTICIPANT THAT CHANGED RECORD 364 | LOCAL TICK COUNT WHEN CAME FROM FULL 366 | ON PARTIAL PARTICIPANT |
|---|---|---|---|
| X 1, | G 66, | 34 | |

| REPLICA ID 374 | WHEN RECORD CHANGED 376 | ON PARTIAL PARTICIPANT |
|---|---|---|
| X 1, | 01-26-06-12:32PM | |

| REPLICA ID 362 | TICK COUNT OF LAST PARTICIPANT THAT CHANGED RECORD 364 | LOCAL TICK COUNT WHEN CAME FROM FULL 366 | ON FULL PARTICIPANT |
|---|---|---|---|
| X 1, | G 67, | 34 | |

381 → ; 388 → X 1,; 390 → G 67,; 392 → 34

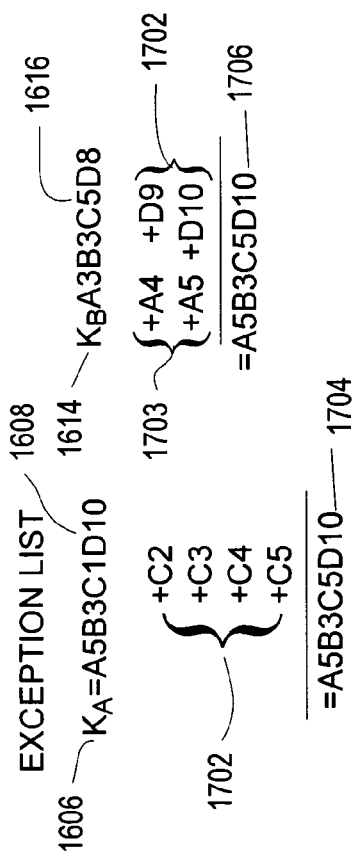
FIG. 24A
FIG. 24B
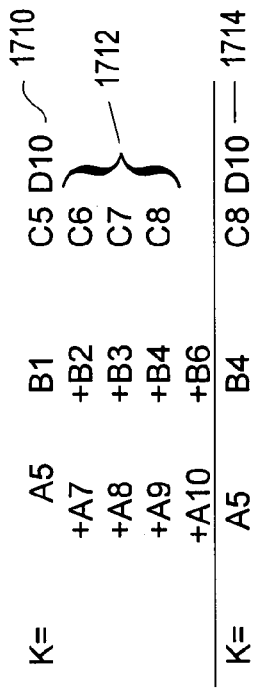
FIG. 24C

SYNCHRONIZATION PEER PARTICIPANT MODEL

CROSS-REFERENCE TO RELATED APPLICATIONS

This is a continuation-in-part application of application Ser. No. 10/631,591, filed Jul. 31, 2003, the specification of which is incorporated by reference herein in its entirety.

BACKGROUND

In today's world of technology and digital information handling, individuals may store information or data in a variety of different devices and locations. Often the user stores the same information in more than one device and/or location. The user would like all of the various data stores to have the same information without having to manually input the same changes to each data store. Replication is one process used to ensure that each data store has the same information.

For example, a user may maintain an electronic address book in a variety of different devices or locations. The user may maintain the address book, for example, on a personal information manager stored on their desktop computer, on their laptop computer, in a personal digital assistant (PDA), in an on-line contacts manager, and the like. The user can modify the electronic address books in each location by, for example, adding a contact, deleting a contact, or changing contact information. Replication is used to ensure that the change made on a particular device is ultimately reflected in the data stores of the user's other devices.

Replication becomes increasingly more complicated as the number of devices and/or services a particular user uses increases and/or the size or processing capabilities of those devices decreases. For example, many users have thumb drives, removable memory, PDA's, phones, portable music devices, and so on. Information such as contacts records would be useful to have on many of those devices and/or synchronized among those devices, yet many of those types of devices do not even have a computer processor that is often required to participate in a typical synchronization process. These synchronization problems can be further compounded when group sharing of data is involved, such as multiple users sharing a group calendar.

SUMMARY

Various technologies and techniques are disclosed that improve synchronization of data between varying types of devices and/or services. A full participant device or service receives a request from another device or service to perform a synchronization operation using a synchronization engine. The other device or service communicates with the synchronization engine of the full participant through an implementation of a handler interface. The synchronization engine orchestrates the communication between the various installed handlers on a system to drive synchronization between end points. Once connected to the synchronization engine, the handlers are inspected to determine the synchronization scenarios they are able to take part in, or simply, their participation levels as defined in a peer participant model.

In one implementation, the synchronization engine determines whether the device or service is a full participant, a partial participant, or a simple participant. The device or service is a simple participant if it has a data store for synchronized data and no knowledge store. The simple participant is not responsible for tracking what changes it makes to the data. The device or service is a partial participant if it has a data store for synchronized data and a knowledge store, but may not understand the knowledge. The partial participant is responsible for tracking what changes it makes to the data. The device or service is a full participant type if it has a data store for synchronized data and a knowledge store and understands the knowledge and some or all operations on it. Knowledge refers to "synchronization metadata". The synchronization engine performs the synchronization operation with the device using a set of logic that is appropriate for the type of device or service. One implementation of this architecture provides a multi-master 2-way synchronization community, and allows devices and/or services with limited processing and/or storage capabilities (such as thumb drives, some personal digital assistants and/or phones, etc.) to participate at some level in the synchronization process. Multiple master synchronization means allowing two or more participants each having writeable replicas of the same data to come together and synchronize whether or not they have ever communicated before.

As one non-limiting example, a partial participant device or service can participate in a multi-master two-way synchronization operation in one implementation because of the knowledge stored on the partial participant, even though the partial participant does not even understand the knowledge. As another non-limiting example, a simple participant that has a data store for storing replicated data but no knowledge (such as a thumb drive) can participate in a synchronization process with a full participant in one implementation.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 10-11 illustrate an example record on a partial participant device prior to modification and after modification by the partial participant device.

FIG. 12 illustrates an example record on a partial participant device prior to modification.

FIG. 13 illustrates an example change tracking record on a partial participant device to track changes made to the record of FIG. 12.

FIG. 14 illustrates the example record of FIG. 12 that is updated by a full participant device after determining that the partial participant modified the data as described in the change tracking record of FIG. 13.

FIG. 24A illustrates one implementation of updating knowledge in a participant subsequent to a replication using an exception list.

FIG. 24B illustrates one implementation of updating knowledge in a participant subsequent to a replication using a pairwise maximum of knowledge vectors.

FIG. 24C illustrates one implementation of updating knowledge in a participant subsequent to a replication where exceptions exist in the updated knowledge.

DETAILED DESCRIPTION

Figure 1:
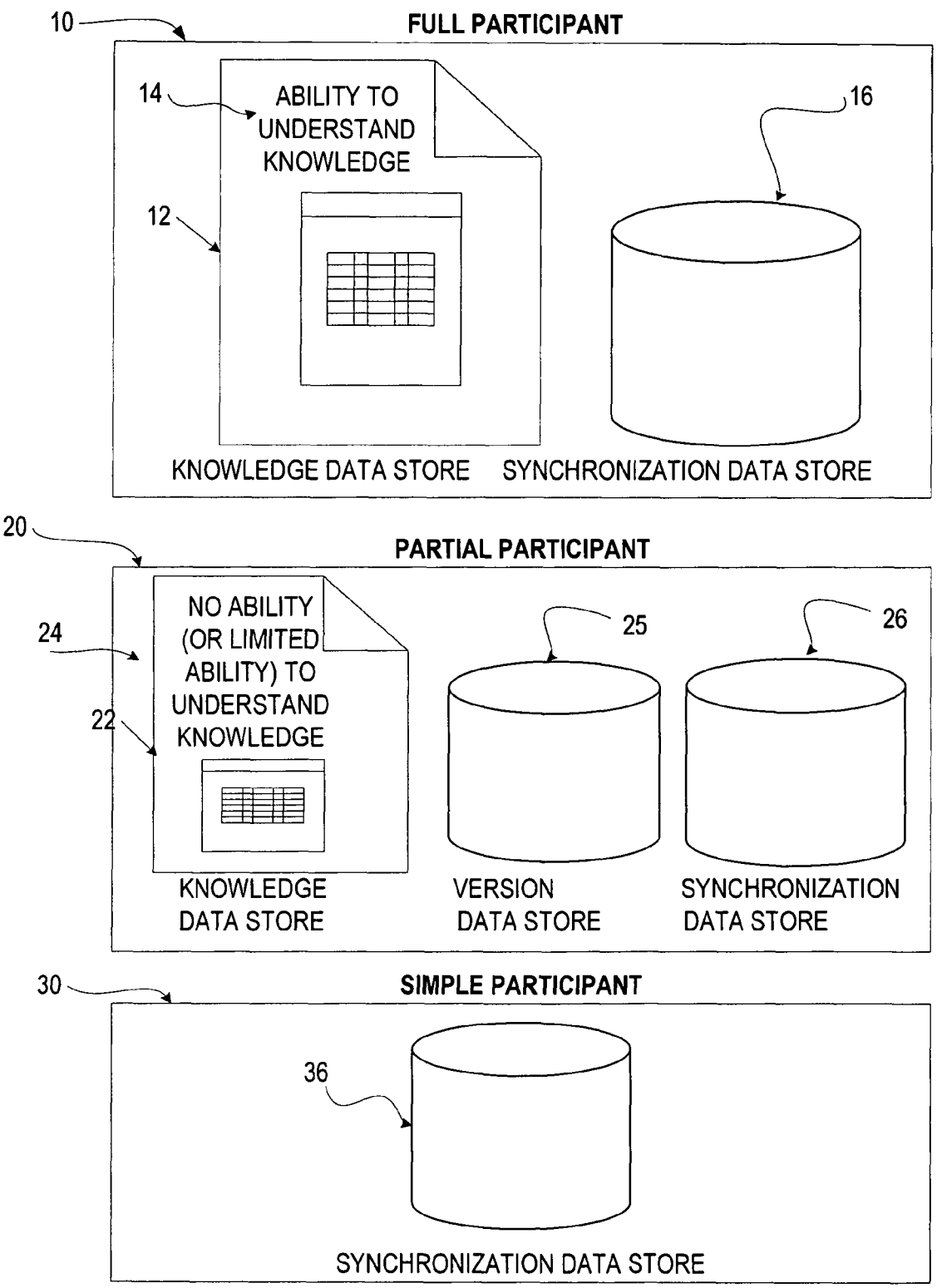
FIG. 1 is a diagrammatic view of a synchronization peer participant model of one implementation showing a graphical representation of a full participant, partial participant, and simple participant.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as one or more techniques that improve synchronization of data between various devices having various capabilities, but the system also serves other purposes in addition to these. In one implementation, one or more of the techniques described herein can be implemented as features within a synchronization program such as MICROSOFT® ACTIVESYNC®, or from any other type of program or service that participates in a synchronization process between devices. In another implementation, one or more of the techniques described herein are implemented as features with other applications that deal with synchronizing data across devices and/or services. The term mobile device as used herein is meant to include cellular phones, personal digital assistants, portable media players, voice-over-IP phones, and numerous other types of mobile devices of varying levels of capabilities.

FIG. 1 is a diagrammatic view of a synchronization peer participant model of one implementation showing a graphical representation of a full participant 10, a partial participant 20, and a simple participant 30. The term participant is also referred to herein as "replica". Participant and replica refer to devices and/or services that participate in a synchronization community. Full participant 10 has a knowledge data store 12 and an ability to understand the knowledge 14. It also has a synchronization data store 16 for storing the actual data that was synchronized, such as contact information or other information being synchronized among devices. A few non-limiting examples of full participants include personal computers, some PDA's, some phones, some other mobile devices, and/ or other devices capable of storing and understanding knowledge.

Each full participant maintains "knowledge" in a knowledge data store that facilitates efficient and improved replication. In one implementation, knowledge is metadata that describes t he changes that are known to a given participant. Knowledge may be represented as a vector of pairs or change IDs where each pair or change ID represents a replica ID and a maximum version (replica ID, max version). The number of pairs in a particular knowledge vector may change as participants are added to or removed from the sync community. While the knowledge vector may also be expressed differently, it is advantageous to concisely represent the changes of which a particular participant is aware. There is no requirement that the particular knowledge specifically contain a change ID for each participant in the sync community. Participants are relieved from tracking what other participants already know, as this information is effectively represented by the knowledge of the participant.

Similarly to full participant 10, partial participant 20 also contains a knowledge data store 22. Unlike full participant 10, however, partial participant 20 has no ability (or a limited ability) to understand the knowledge 24. Partial participant includes a synchronization data store 26 for storing the synchronized data. Partial participant includes a version data store 25 for storing information related to changes it makes to the synchronization data store 26. Non-limiting examples of partial participants can include some personal digital assistants, phones, some other mobile devices, and/or other types of devices capable of operating a simple program that tracks changes made to the synchronization data store 26.

Simple participant 30 has a synchronization data store 36, and no knowledge store. Examples of simple participants can include, but are not limited to, some thumb drives, some memory cards, and/or other devices that are not capable of operating a simple program that tracks changes made to synchronization data store 36.

Figure 2:
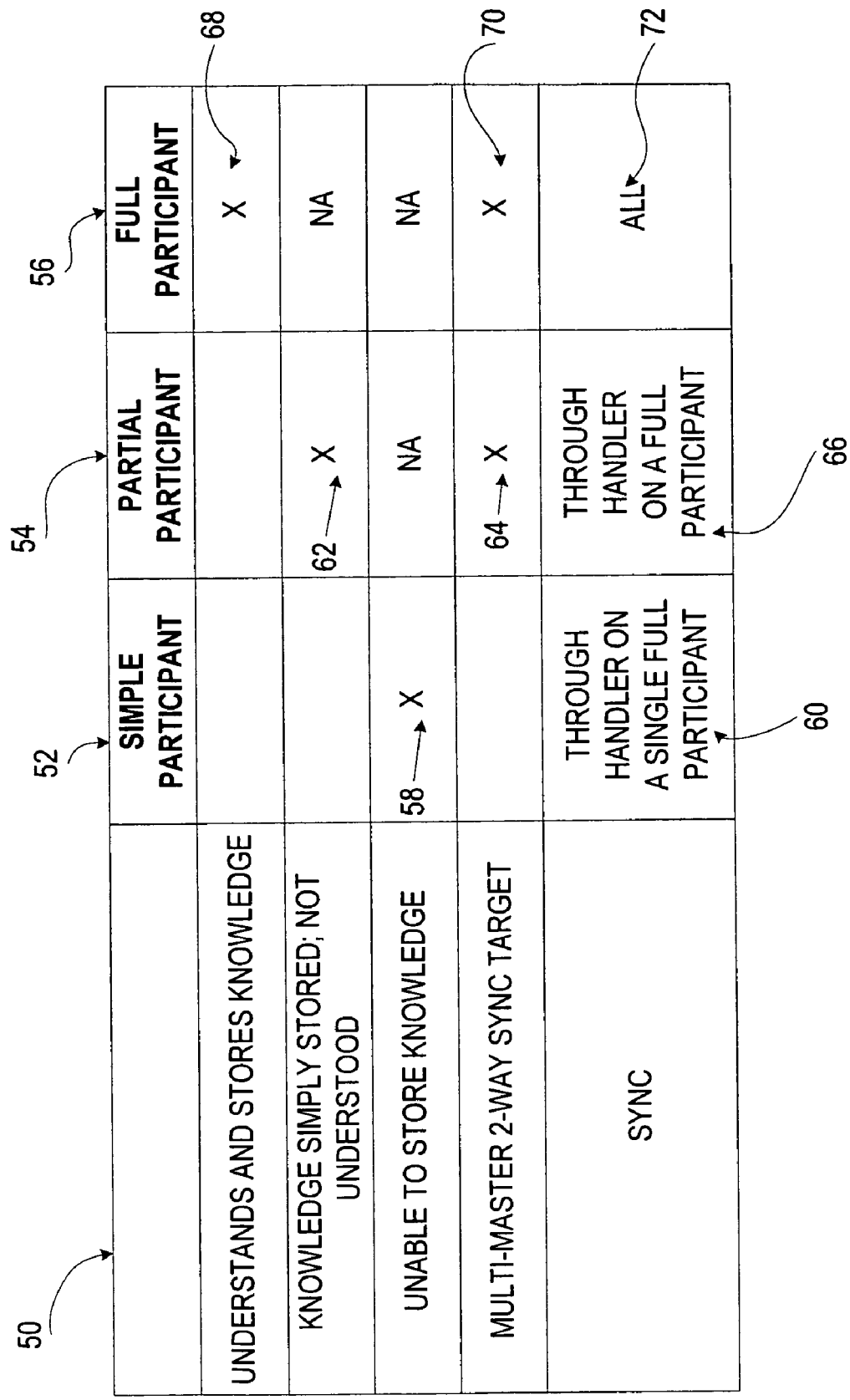
FIG. 2 is a diagrammatic view of a synchronization peer participant model of one implementation showing a tabular representation of a full participant, partial participant, and simple participant.

Turning now to FIG. 2, a tabular representation 50 of the peer participant model is shown. Simple participant 52, partial participant 54, and full participant 56 have one or more characteristics. Some of these characteristics were described in the discussion of FIG. 1. Simple participant 52, for example, is unable to store knowledge 58. Simple participant is capable of synchronizing 60 with a single full participant through a handler. Partial participant 54 stores but does not understand knowledge 62. Partial participant 54 is capable of participating in a multi-master 2-way synchronization 64. Alternatively or additionally, partial participant 54 is capable of synchronizing 66 through a handler on a full participant. In this fashion, partial participant 54 is capable of participating in a managed peer-to-peer scenario through one or more full participant devices. Thus, partial participants can synchronize with each other through the use of a full participant. Full participant 56 understands and stores knowledge 68, can participate in a multi-master 2-way synchronization target 70, and can perform peer to peer synchronizations 72.

Figure 3:
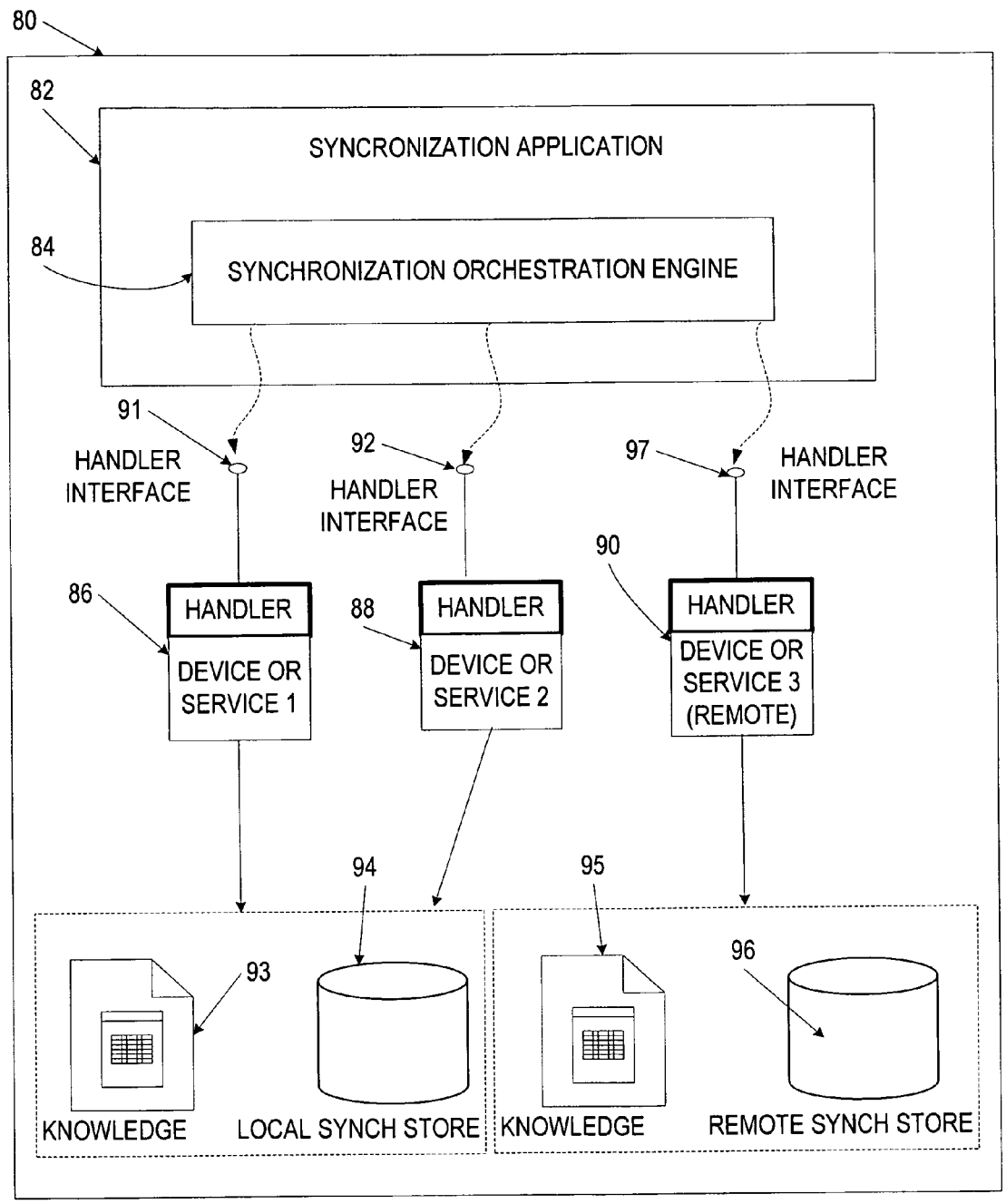
FIG. 3 is a diagrammatic view of a synchronization system of one implementation with handlers for interfacing with participant devices.

FIG. 3 is a diagrammatic view of a synchronization system 80 of one implementation with handlers for interfacing with one or more participant devices. Synchronization application 82 includes a synchronization orchestration engine 84 that is responsible for completing the synchronization loop among participants and transferring updated changes between other connected participants. Various handlers 86, 88, and 90 are used for allowing the other participants in the synchronization community to communicate with the synchronization engine 84. The synchronization engine 84 communicates with handlers 86, 88, and 90 through handler interfaces 91, 92 and 97, respectively. Handlers 86, 88, and 90 then communicate with the knowledge stores 93 and 95, local synchronization data store 94, and remote synchronization data store 96 to access data, if applicable. In one implementation, one or more of the data stores shown in FIG. 1, such as remote synchronization data store 96, are located on one or more separate computers or devices.

Figure 4:
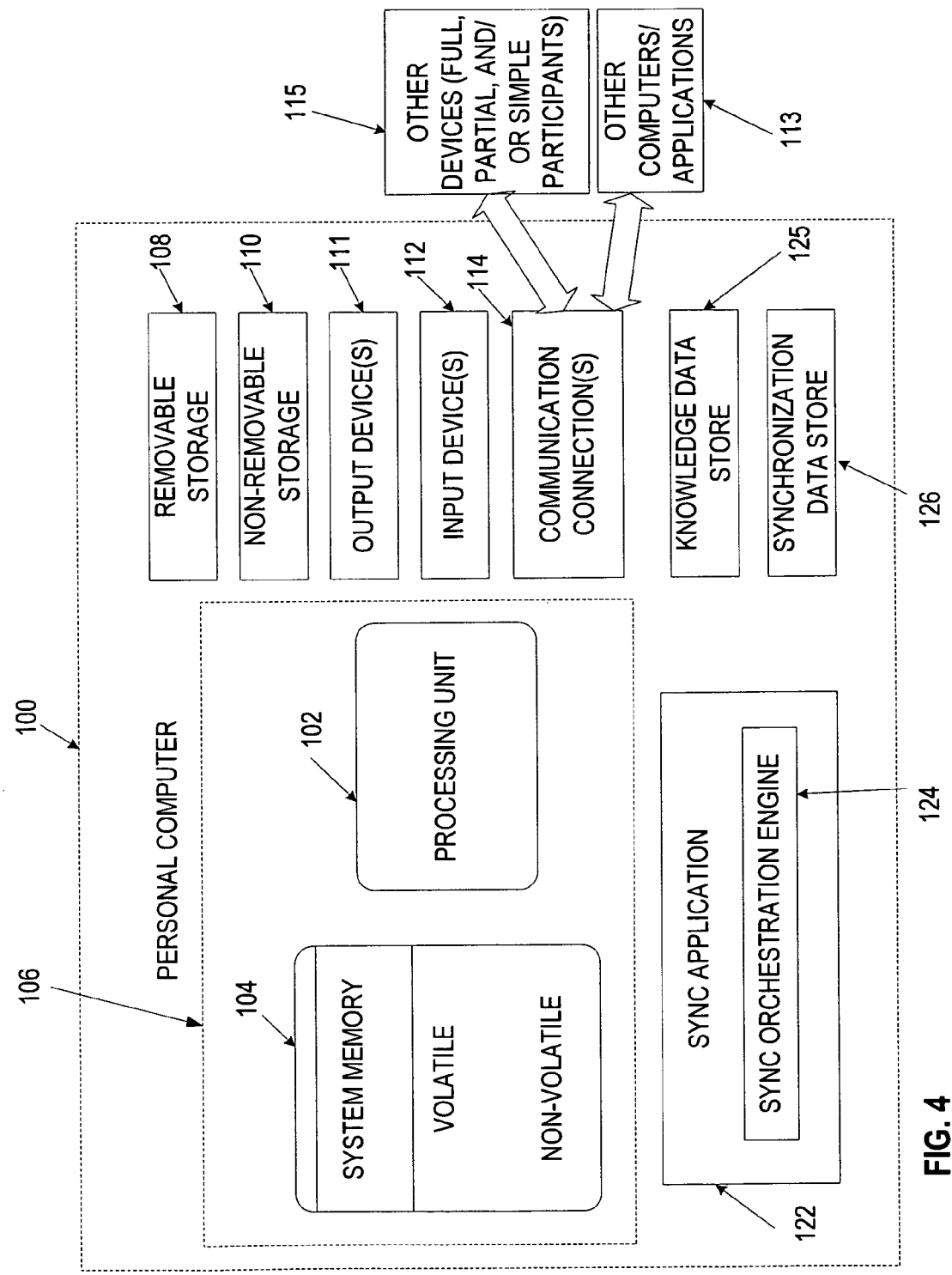
FIG. 4 illustrates an exemplary computer system that is a suitable operating environment for one or more implementations, such as for operating a synchronization application on a full participant device.

As shown in FIG. 4, an exemplary computer system to use for implementing one or more parts of the system includes a computing device, such as personal computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 4 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 4 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other devices 115, such as full participants, partial participants, and/or simple participants. Computing device 100 may also communicate with other computers and/or applications 113. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

In one implementation, computing device 100 serves as a full participant device for implementing one or more of the techniques discussed herein. In such an implementation, computing device 100 contains a synchronization application 122 with a synchronization orchestration engine 124, as well as a knowledge data store 125, and a synchronization data store 126. In one implementation, knowledge data store 125 and/or synchronization data store 126 are included as part of computer storage media as described herein, such as memory 104, removable storage 108, non-removable storage 110, and/or other computer storage media. In one implementation, synchronization application 122 is the same as synchronization application 82 shown on FIG. 3.

Figure 5:
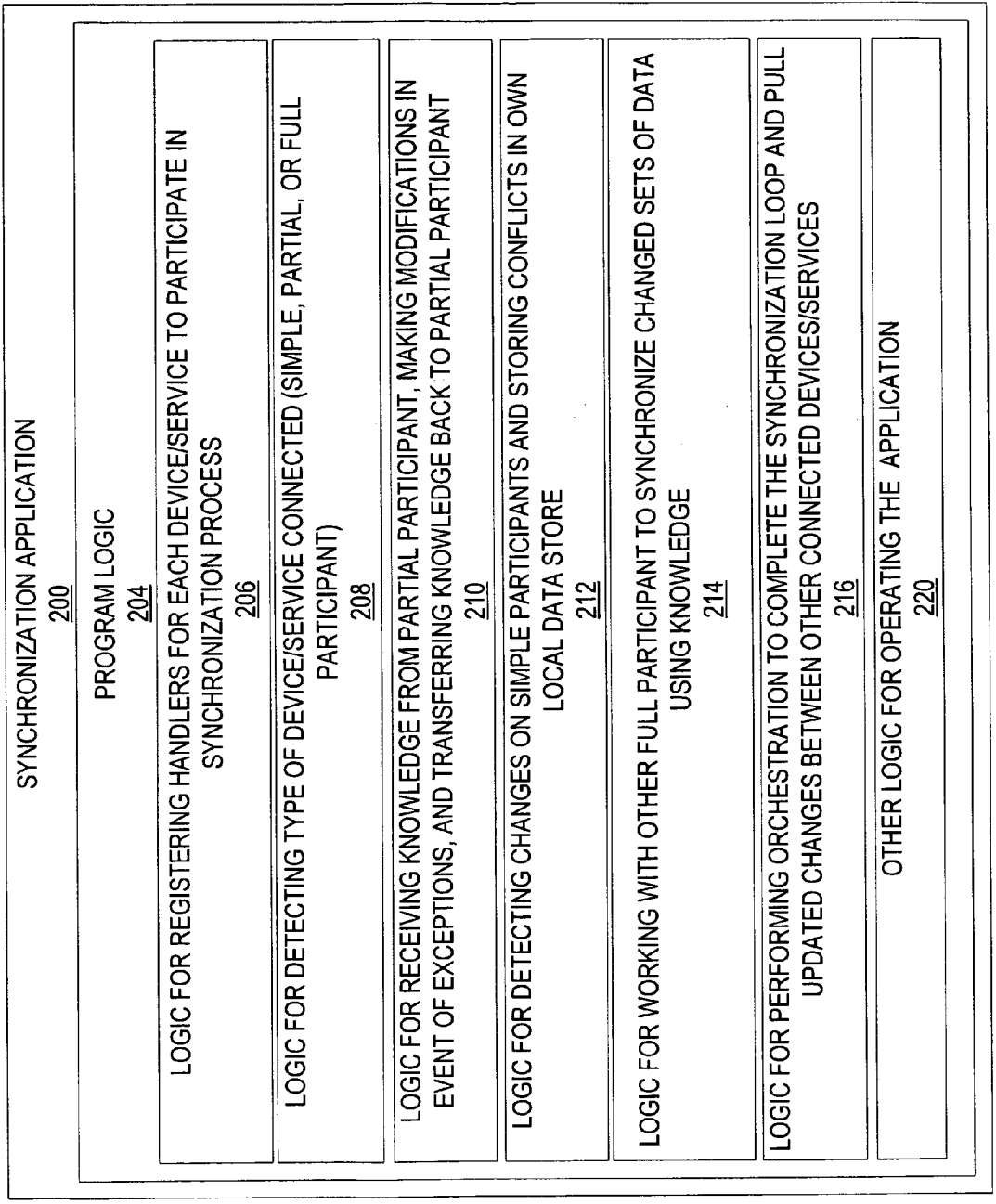
FIG. 5 is a diagrammatic view of a synchronization application of one implementation.

Turning now to FIG. 5 with continued reference to FIG. 4, a synchronization application 200 of one implementation is illustrated. In one implementation, synchronization application 200 is one of the application programs that reside on computing device 100. Alternatively or additionally, one or more parts of synchronization application 200 can be part of system memory 104, on other computers and/or applications 113, or other such variations as would occur to one in the computer software art.

Synchronization application 200 includes program logic 204, which is responsible for carrying out some or all of the techniques described herein. Program logic 204 includes logic for registering handlers for each device and/or service to participate in the synchronization process 206; logic for detecting the type of device and/or service connected (simple, partial, or full participant) 208; logic for receiving knowledge from a partial participant, making modifications in event of exceptions, and transferring knowledge back to the partial participant 210; logic for detecting changes on simple participants and storing conflicts in its own local data store 212; logic for working with other full participant(s) to synchronize changed sets of data using knowledge 214; logic for performing orchestration to complete the synchronization loop and pull updated changes between other connected devices and/or services 216; and other logic for operating the application 220.

In one implementation, program logic 204 is operable to be called programmatically from another program, such as using a single call to a procedure in program logic 204. Alternatively or additionally, it will be understood that program logic 204 can alternatively or additionally be embodied as computer-executable instructions on one or more computers and/or in different variations than shown on FIG. 4.

Figure 6:
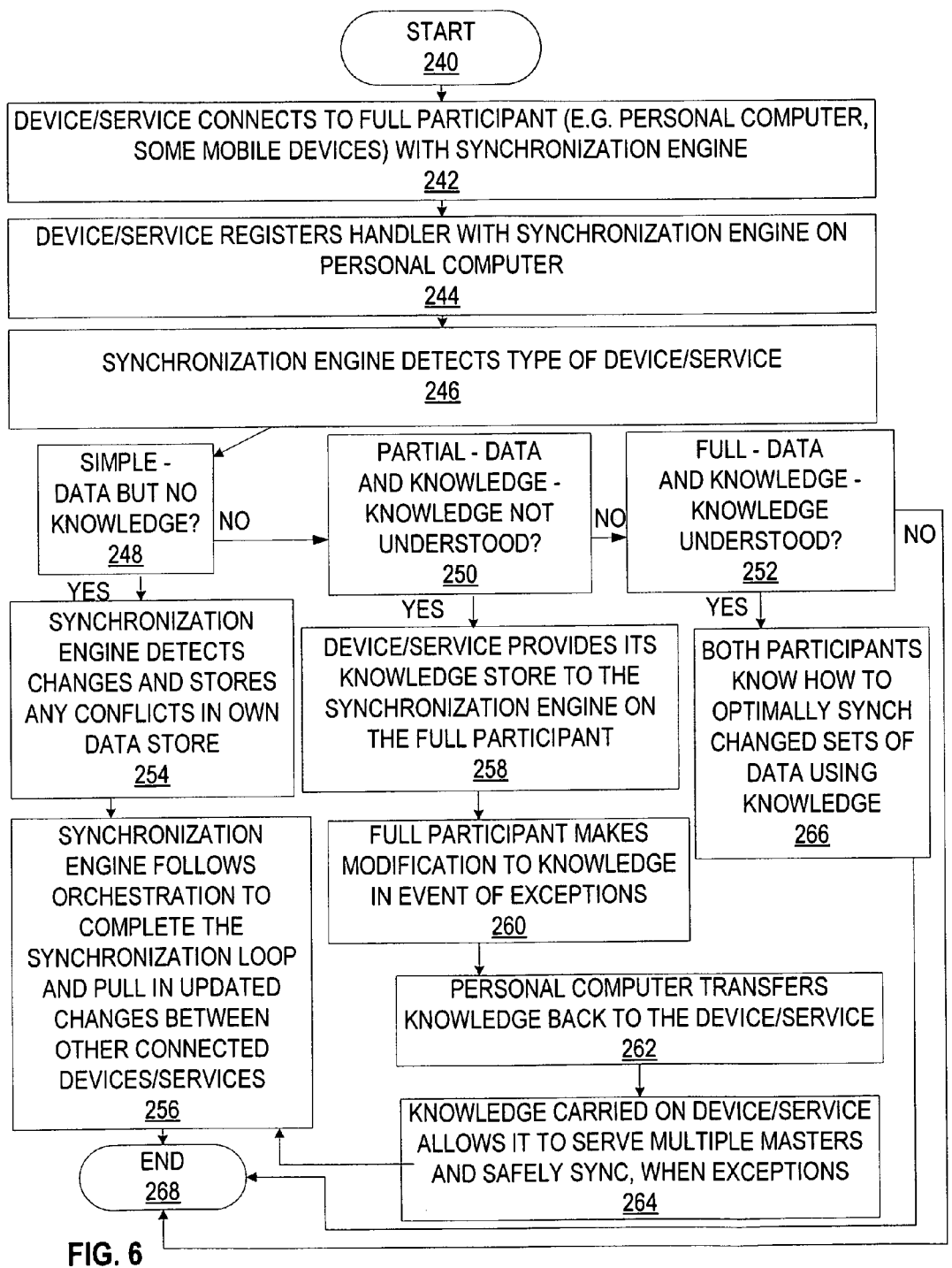
FIG. 6 is a high-level process flow diagram for one implementation of the system.

FIG. 6 is a high level process flow diagram for synchronization application 200. In one form, the process of FIG. 6 is at least partially implemented in the operating logic of computing device 100, other computers/applications 113, and/or other participant devices 115. The procedure begins at start point 240 with the participant device or service connecting to a full participant (such as computing device 100 or some mobile devices) with the synchronization engine (stage 242). The device or service registers a handler or otherwise communicates with the synchronization engine on the full participant (stage 244). The synchronization engine detects the type of device or service (stage 246), and executes the appropriate synchronization logic based on the type of participant: simple (decision point 248), partial (decision point 250), or full (decision point 252). For example, if the device or service is a simple participant that has a synchronization data store but no knowledge (decision point 248), the synchronization engine detects changes on the simple participant and stores any conflicts in its own local data store on the full participant (stage 254).

If the device or service is a partial participant that has a synchronization data store and stored-but-not understood knowledge (decision point 250), then the device or service provides its knowledge store to the synchronization engine on the full participant (stage 258). The full participant makes modifications to the knowledge, such as in the event of exceptions (stage 260), and the full participant transfers the changed knowledge back to the partial participant (stage 262). The knowledge carried on the partial participant device or service allows it to safely synchronize with multiple masters, even when exceptions occur (stage 264). If the device or service is a full participant that has a synchronization data store and also stores and understands knowledge (decision point 252), then both participants know how to optimally synchronize changed sets of data using knowledge (stage 266). One or more implementations for synchronizing data between full participants are described in detail in the discussion on FIGS. 18-26.

After determining the type of participant the device or service is and handling changes and conflicts accordingly, the synchronization engine then follows orchestration to complete the synchronization loop and pull in updated changes between other connected participant devices and/or services (stage 256). The process ends at end point 268.

Figure 7:
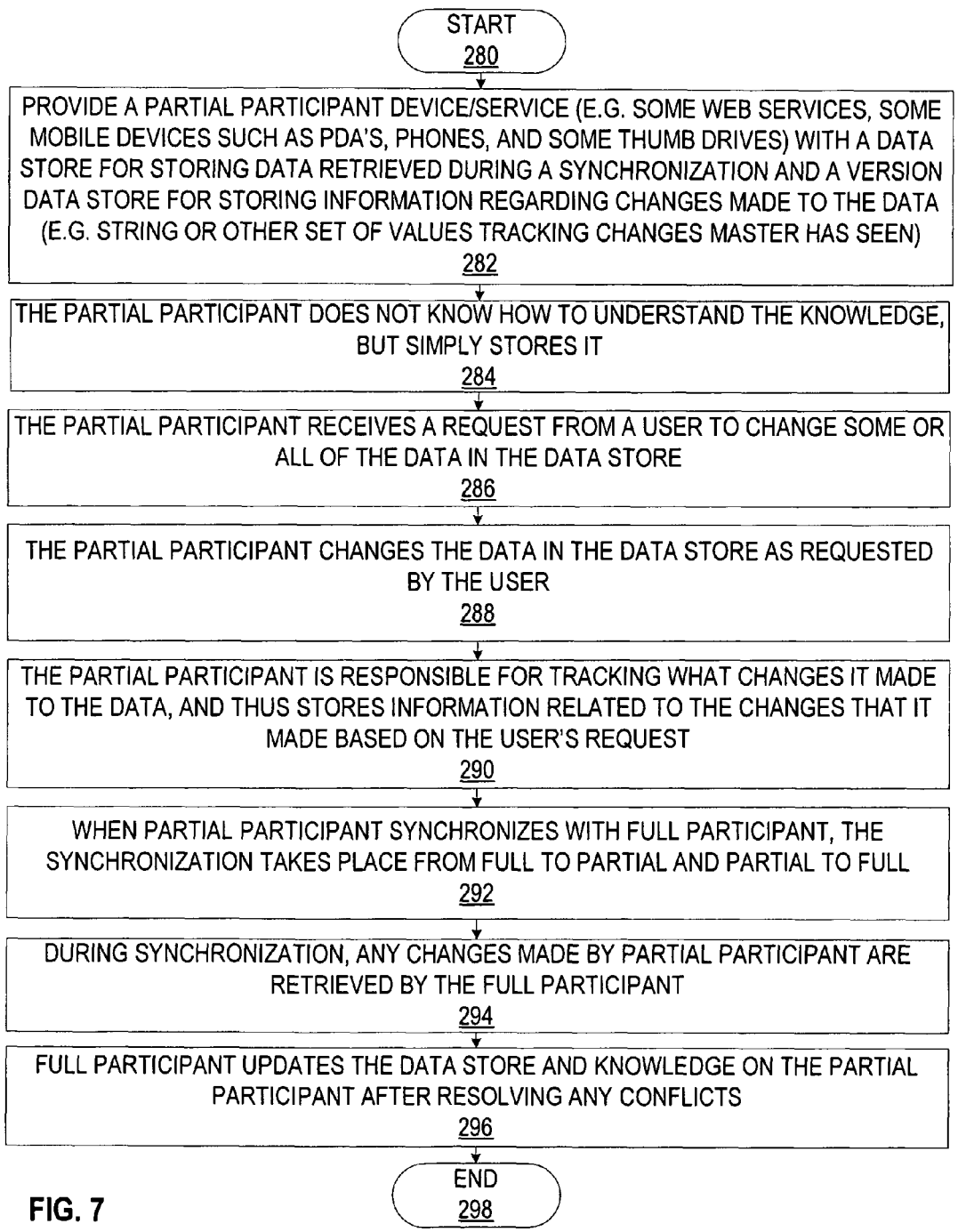
FIG. 7 is a process flow diagram for one implementation illustrating the stages involved in updating and synchronizing data using a partial participant device.

FIG. 7 is a process flow diagram illustrating the stages involved in updating and synchronizing data using a partial participant device. In one form, the process of FIG. 7 is at least partially implemented in the operating logic of computing device 100, other computers/applications 113, and/or other participant devices 115. The procedure begins at start point 280 with providing a partial participant device or service with a data store for storing data retrieved during a synchronization process and a version data store for storing information regarding changes made to the data (e.g. in a vector, string, and/or other fashion for tracking changes the full participant(s)/master(s) have seen) (stage 282). A few non-limiting examples of partial participants include some web services, some thumb drives, some mobile devices such as some PDA's and/or some phones, and/or other devices or services that can store knowledge but not understand it.

The partial participant does not know how to understand the knowledge, but simply stores it (stage 284). The partial participant receives a request from a user to change some or all of the data in the synchronization data store (stage 286). The partial participant changes the data in the data store as requested by the user (stage 288). The partial participant is responsible for tracking what changes it made to the data, and thus stores information related to the changes that it made based on the user's request (stage 290). In one implementation, when the partial participant synchronizes with a full participant, the synchronization takes place from full to partial and partial to full (stage 292). In one implementation, these are two separate one-way synchronizations. In other implementations, other orders and/or synchronization scenarios are also possible, such as a single one-way synchronization. During synchronization, any changes that are made by the partial participant are retrieved by the full participant (stage 294). The full participant updates the data store and knowledge on the partial participant after resolving any conflicts (stage 296). The process ends at end point 298.

Figure 8:
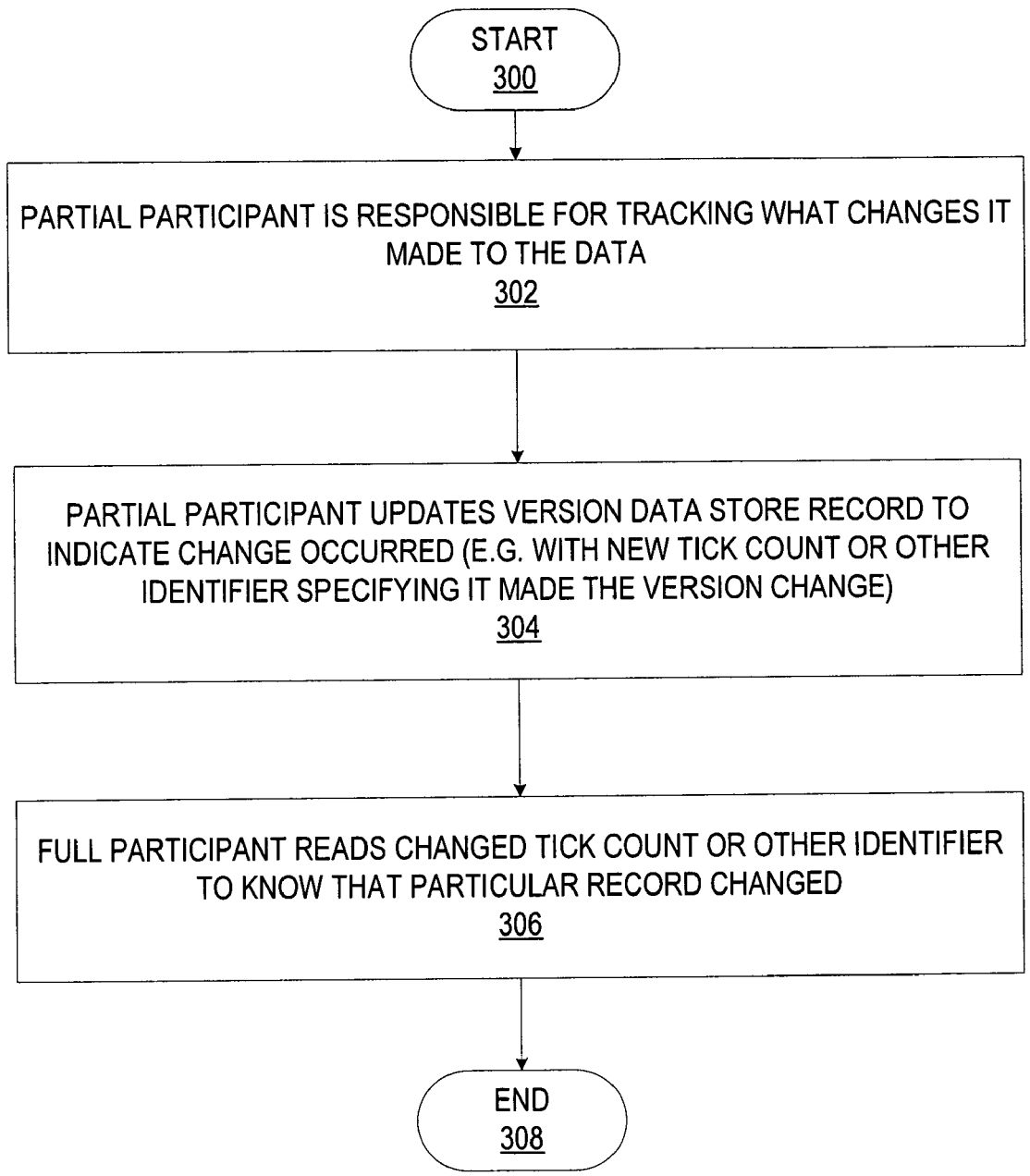
FIG. 8 is a process flow diagram for one implementation illustrating the stages involved in having the partial participant device track changes to the data by updating the record with a new tick count or other identifier.

FIG. 8 is a process flow diagram for one implementation illustrating the stages involved in having the partial participant track changes to the data by updating the record with a new tick count or other identifier. In one form, the process of FIG. 8 is at least partially implemented in the operating logic of computing device 100, other computers/applications 113, and/or other participant devices 115. The procedure begins at start point 300 with the partial participant being responsible for tracking what changes it makes to the data (stage 302). The partial participant updates the version data store record to indicate that a change occurred (stage 304). As a few non-limiting examples, the version data store can be updated with a new tick count, version, or other identifier that identifies that the record changed and/or that identifies the last device or service that made the change. The full participant reads the changed tick count or other identifier to know that the particular record was changed by the partial participant (stage 306). The process ends at end point 308.

Figure 9:
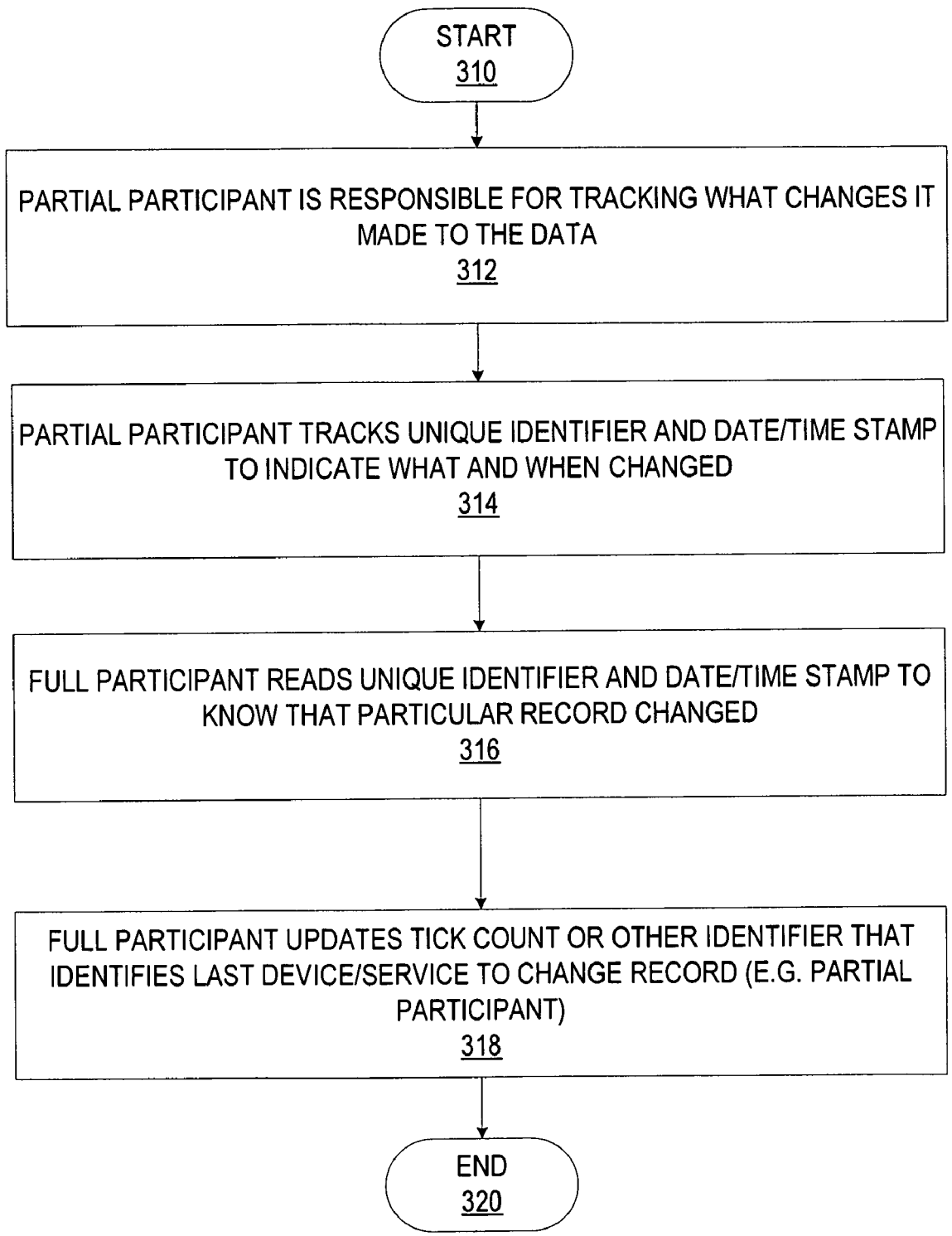
FIG. 9 is a process flow diagram for one implementation illustrating the stages involved in having the partial participant device track changes it made to the data by separately storing a record identifier and date/time for the change.

FIG. 9 is a process flow diagram illustrating the stages involved in one implementation where the partial participant tracks changes it made to the data by separately storing a record identifier and date/time for the change. In one form, the process of FIG. 9 is at least partially implemented in the operating logic of computing device 100, other computers/applications 113, and/or other participant devices 115. The procedure begins at start point 310 with the partial participant being responsible for tracking what changes it makes to the data (stage 312). The partial participant tracks a unique identifier that identifies the replica record and a date/time stamp indicating the date/time of when the record was changed (stage 314). The full participant reads the unique identifier and the date/time stamp to know that the particular record changed (stage 316). The full participant updates the tick count or other identifier that identifies the last device or service to change the record, which in this case is the partial participant (stage 318). The process ends at end point 320.

FIGS. 10-11 illustrate an example record on a partial participant device prior to modification and after modification by the partial participant device according to the stages described in FIG. 8. In one implementation, record 330 of FIG. 10 includes a replica ID field 332, a tick count field 334 of the last participant that changed the record, and a local tick count field for when the record came from the full participant 336. The respective values 338, 340, and 342 in fields 332, 334, and 336, respectively can be stored in a string, vector, and/or any other type of representation suitable for storing on devices or services having limited storage capacity and/or resources. As described previously, numerous other variations can also be used to indicate that a particular record on the partial participant has been changed.

Turning now to FIG. 11, record 343 shows the data after it has been revised by and on the partial participant. Replica ID field 332 has remained a value of "X1" (350), since that is a unique identifier for the record. The tick count field 334 of the last computer that changed the record has been modified from a value of "G66" (340 on FIG. 10) to a value of "G67" (352). The "G" represents the participant that made the change, and the "67" is the next higher number available in the tick counter sequence. The local tick count when it came from the full participant field 336 remains the same value of "34" (354).

FIG. 12 illustrates an example record on a partial participant device prior to modification according to the stages described in FIG. 9. Similar to the example of FIGS. 10 and 11, the record 360 includes a value 368 for Replica ID field 362, a value 370 for tick count field 364 of the last participant that changed the record, and a value 372 for local tick count field 366 from when it came from the full participant. In this implementation, the partial participant updates a separate change tracking record instead of the record with the tick count. Record 360 shows the record with the tick count prior to modification of the underlying data by the partial participant. Record 375 of FIG. 13 illustrates an example change tracking record on a partial participant device that is to track changes made to the record of FIG. 12 according to the stages described in FIG. 9. The replica ID field 374 and date/time field 376 for when the record changed are stored on partial participant. In this example, value "X1" 378 is stored for the Replica ID 374, and "01-26-06-12:32 PM" 380 is stored for the date/time field 376. When the partial participant next connects to a full participant, the full participant retrieves and interprets record 375 to determine that the partial participant made changes to the underlying data in the synchronization data store. Turning now to FIG. 14, the full participant then updates the tick count field 390 of record 381 of the last participant that changed the record, which in this case is "G67" to represent the partial participant and the next higher tick count number. The local tick count field 366 is revised to an updated value 392, if appropriate. The value 388 for the replica ID field 362 remains the same.

Figure 15:
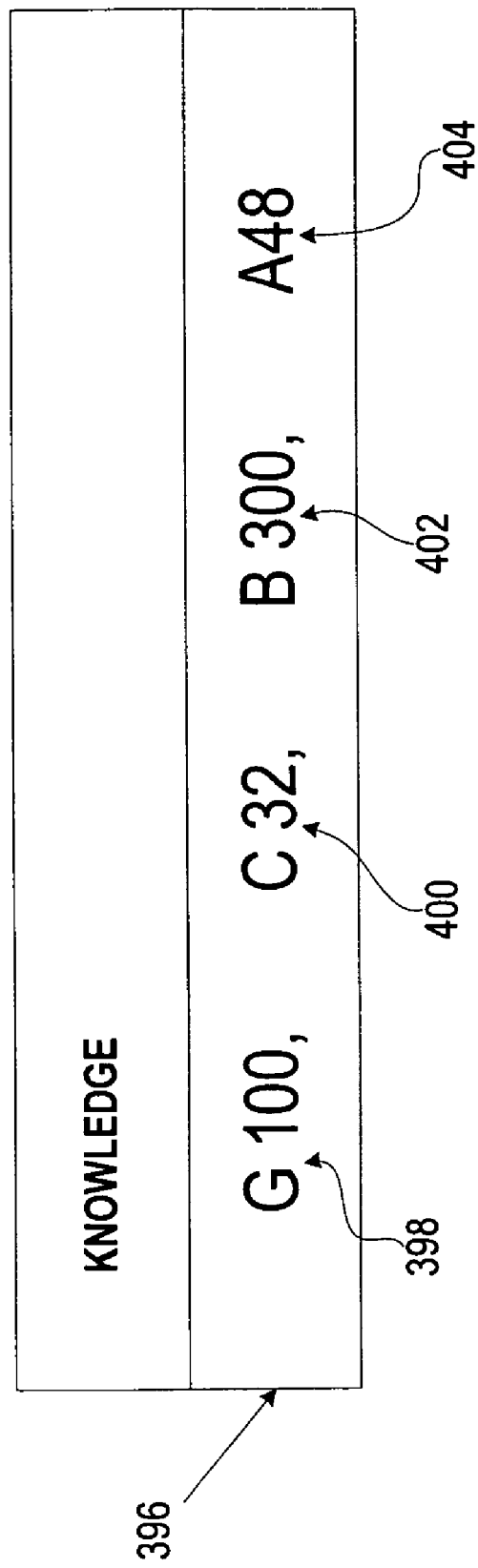
FIG. 15 is an example of a knowledge record stored on a partial participant device or full participant device for one implementation.

FIG. 15 is an example of a knowledge record stored on a partial participant device or full participant device for one implementation. In the example shown, the knowledge record 396 is represented as a string vector as described herein, with values 398, 400, 402, and 404 indicating the participant identifier and sequence number for the last changes that have been seen for that particular device. For example, value "G100" (398) means that this participant has seen all of the changes for device G through record 100. These knowledge vectors are described in great detail in the discussion on FIG. 18-26.

Figure 16:
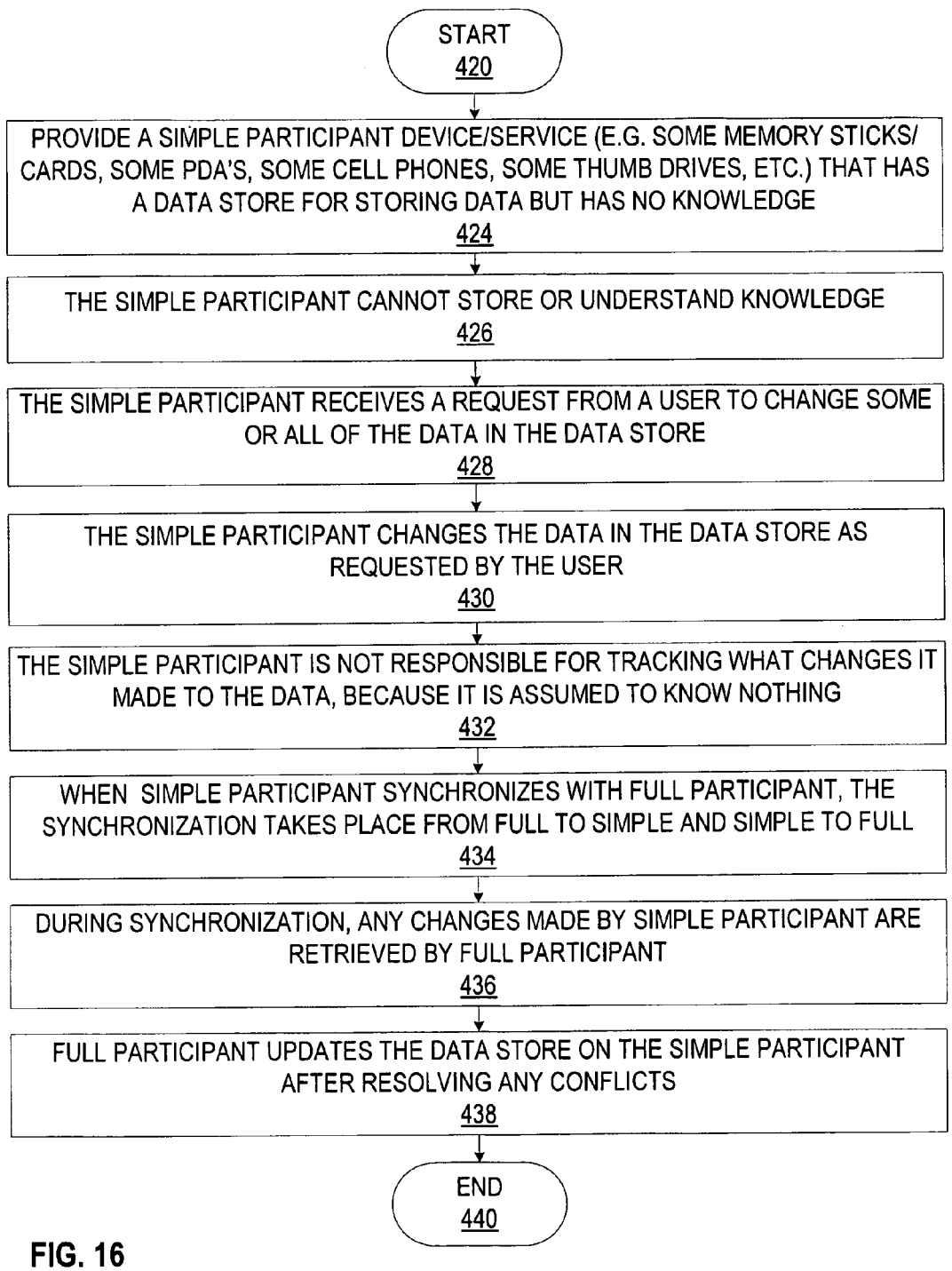
FIG. 16 is a process flow diagram for one implementation illustrating the stages involved in updating and synchronizing data using a simple participant device.

Turning now to FIG. 16, a process flow diagram illustrating the stages involved in updating and synchronizing data using a simple participant device is shown. In one form, the process of FIG. 16 is at least partially implemented in the operating logic of computing device 100, other computers/applications 113, and/or other participant devices 115. The procedure begins at start point 420 with providing a simple participant device or service that has a data store for storing synchronized data but has no knowledge (stage 424). A few non-limiting examples of simple devices include some thumb drives, some memory sticks/cards, some PDA's, some cell phones, and/or other devices or services that cannot store and understand knowledge. The simple participant cannot store or understand knowledge (stage 426), because of device or service limitations or user settings. The simple participant receives a request from a user to change some or all of the data in the synchronization date store (stage 428).

The simple participant changes the data in the synchronization data store as requested by the user (stage 430). One non-limiting example of how the user can change the synchronization data store includes modifying the data in a file browser from another device such as a personal computer, such as inserting a thumb drive into a personal computer and then changing the contents of the thumb drive. The simple participant is not responsible for tracking what changes it made to the data, because it is assumed to know nothing (stage 432). When the simple participant synchronizes with the full participant, the synchronization takes place from the full participant to the simple and then the simple to the full (stage 434). During synchronization, any changes made by the simple participant to the synchronization data store are retrieved by the full participant (stage 436). The full participant updates the synchronization data store on the simple participant after resolving any conflicts (stage 438). The process ends at end point 440.

Figure 17:
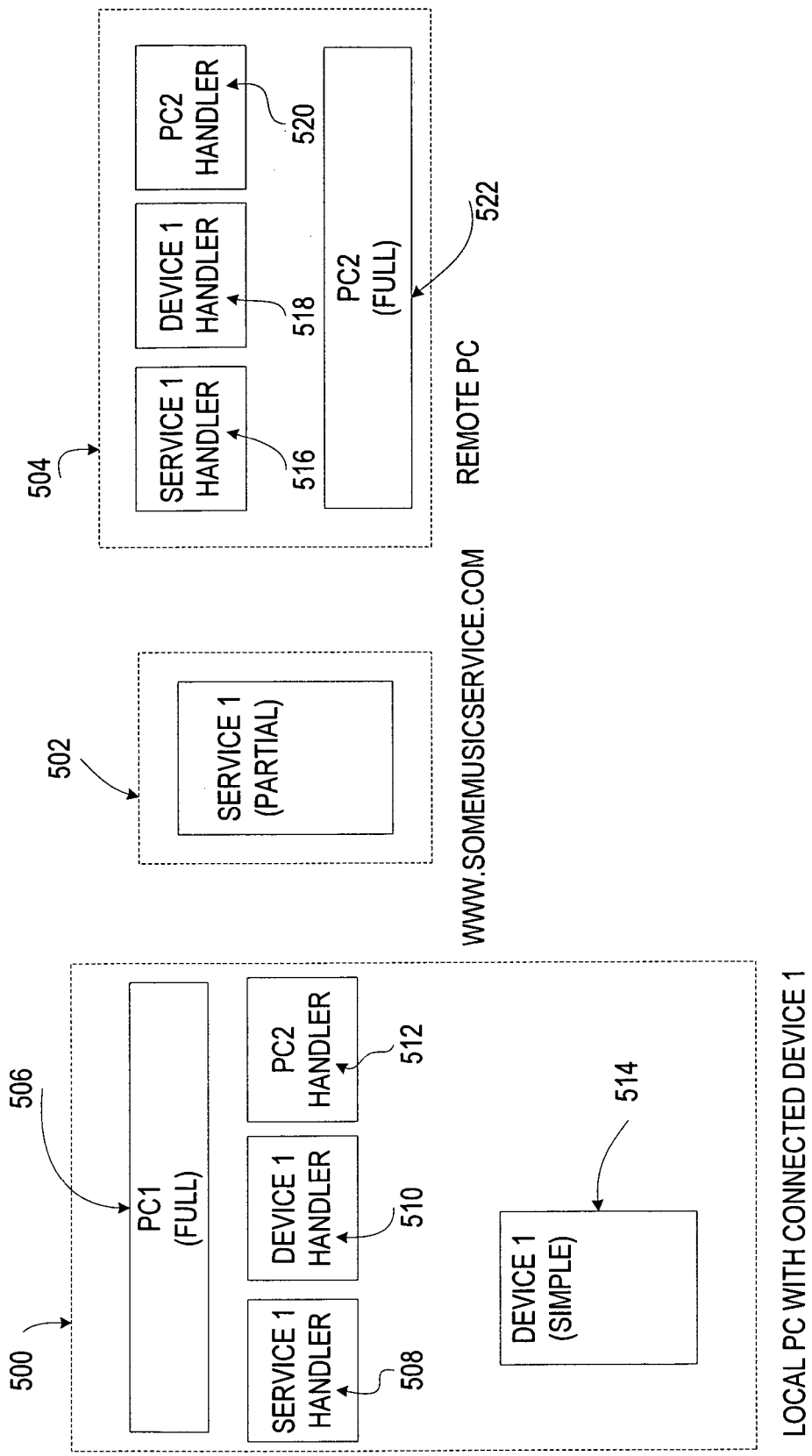
FIG. 17 is a diagrammatic view of an exemplary synchronization community for one implementation having multiple devices and handlers.

FIG. 17 is a diagrammatic view of an exemplary synchronization community for one implementation having multiple devices and handlers. FIG. 17 illustrates a full participant 500 called personal computer 1, or "PC1" (506); a simple participant called device 1 (514); a partial participant 502 called "Service1"; and a second full participant 504 called personal computer 2, or "PC2". For the sake of illustration, assume that device 1 (514) is a thumb drive or other memory card, service 1 is a music service located on a web server, and PC1 and PC2 are personal computers, similar to computing device 100. Full participant 500 has handlers 508, 510, and 512, and full participant 504 has handlers 516, 518, and 520. These handlers are responsible for interfacing with the various participants that are part of the synchronization community. When device1 (514) connects to PC1 (506), the synchronization process described in FIG. 6 executes. The type of participant is determined, which in this case is simple, and then the synchronization takes place between device 1 (514), and PC1 (506) of full participant 500. Once the synchronization is completed between these two participants (500 and 514), orchestration will cause the other participants (502 and 504) to be updated if they are connected and/or next time they connect to PC1 (506) or Device 1 (514).

Turning now to FIG. 18-26, one or more implementations for synchronizing data between full participants (e.g. two personal computers such as device 100) are described. One or more of the examples discussed in FIGS. 18-26 could also apply at least in some part to a partial participant scenario or other scenarios described in the previous figures. Alternatively or additionally, one or more of the techniques discussed in FIGS. 18-26 can be implemented on a device such as computing device 100 of FIG. 4. The term "replica" as used in the following discussion also means "participant".

The replicas/participants in a sync community replicate by providing their own knowledge with the replica with which they replicate. To reduce the amount of data representing knowledge that must be sent between replicating replicas, the knowledge may be expressed as a knowledge vector as previously described. Thus, the knowledge that is sent between the replicas does not need to include every change ID, but may be in the form of a vector that represents a number of change IDs. For example, if a replica is aware of all changes made by a replica A from a first change to a tenth change, and all changes made by a replica labeled B from a first change to a fifth change, the replica might send a knowledge vector A10B5 indicating that the replica is aware of all changes corresponding to change IDs A1 to A10 and all changes corresponding to change IDs B1 to B5. While the knowledge may be expressed as a knowledge vector, other implementations of the invention contemplate other expressions of knowledge as well. For example, some implementations of the invention express knowledge using any expression of knowledge in which one can (1) add a change to the expression of knowledge, (2) check whether a change is included in the expression of knowledge, and (3) merge two expressions of knowledge together.

Figure 18:
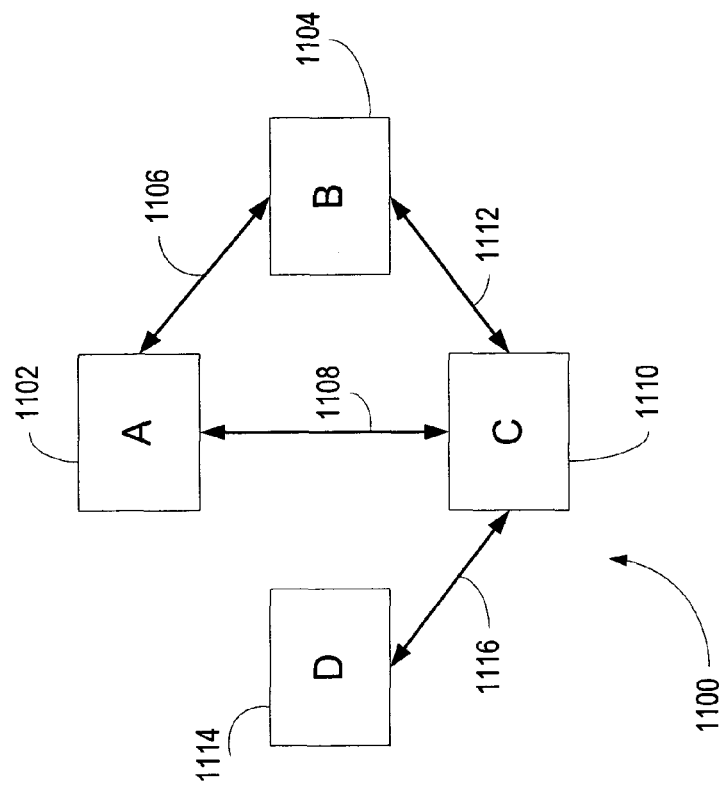
FIG. 18 illustrates an example of a sync community for one implementation.

FIG. 18 illustrates one example of a sync community 1100 with the illustrated topology. The sync community 1100 includes a number of replicas and is one example of an environment for implementing implementations of the present invention. The replicas in the sync community 1100 represent various data stores or devices that may include, but are not limited to, computers, notebook computers, personal digital assistants, cellular telephones, other wireless devices, server computers, online services, and the like or any combination thereof.

In FIG. 18, a replica A 1102 may be electronically coupled to a replica B 1104 through a communication link 1106. The replica A 1102 may be connected through a communication link 1108 to a replica C 1110. Replica C 1110 may be connected to replica B 1104 through a communication link 1112. Replica C 1110 may further be connected to a replica D 1114 through a communication link 1116. In this sync community 1100, although not all of the replicas are directly connected through communication links, changes in any of the replicas can be replicated to any of the other replicas within the sync community 1100.

For example, for the replica A 1102 to be replicated with the replica D 1114, replicas A 1102 and C 1110 may be replicated through the communication link 1108. Thus, replica C 1110 includes changes made on replica A 1102. Replicas C and D then replicate through the communication link 1116, and as such replica D 1114 includes changes from replica A 1102. In this way, replica A 1102 can replicate with replica D 1114 without any sort of direct link. In fact, replicas A 1102 and D 1114 may not even be aware of each other's existence within the sync community 1100. The illustrated communication links can be wired and/or wireless links.

Figure 19:
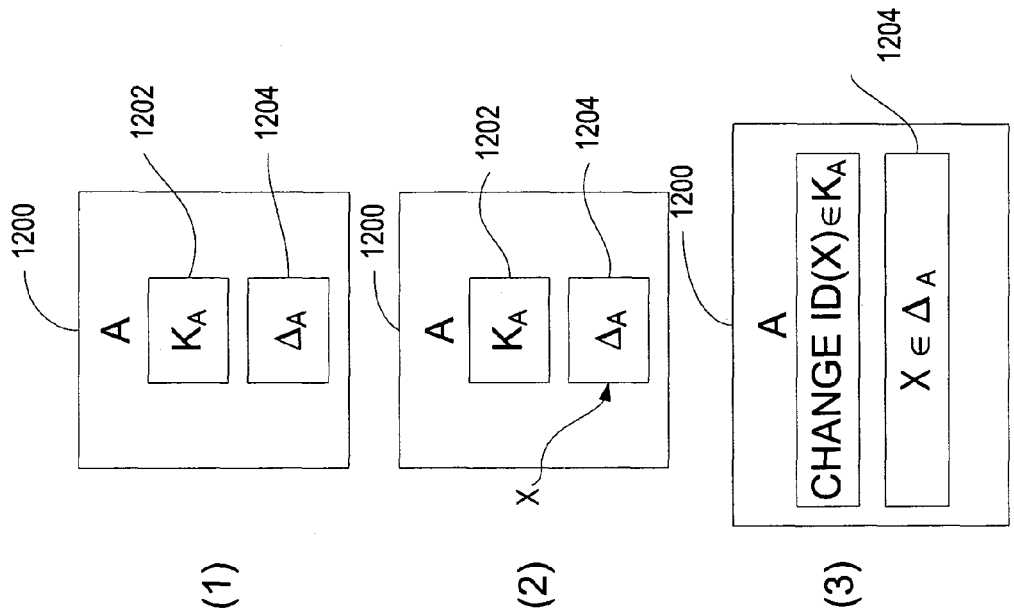
FIG. 19 illustrates a participant and a timewise illustration of one implementation showing a change being added to the participant and the knowledge of the participant being updated to include the change.

Referring now to FIG. 19, one implementation of the invention illustrates how changes are managed in a replica. FIG. 19 shows a time wise progression of a replica A 1200. Replica A 1200 includes knowledge 1202, in this case labeled $K_A$, and changes 1204 in this case labeled $\Delta_A$. Each change in the changes 1204 is the current data content of an item. A change may be a new item added to a replica even though no item was changed per se, the deletion of an item, and the like. Each of the changes 1204 is associated with a version that in one implementation of the invention is a change ID. Notably, one advantageous aspect of the invention is that there is no need to maintain a change log including information about previous changes. Rather, each replica includes knowledge and a database of changes (i.e. current items) where each change has a corresponding version. At time (1), replica A 1200 is in a steady state. At time (2), a user inputs a change labeled X into replica A 1200. FIG. 19 shows the change X being added as a member of the changes 1204. The knowledge 1202 is updated to include a change ID, ChangeID(X), that is associated with the change X and identifies the addition of the change X to the changes 1204. This implementation illustrates one way in which changes to the replica are associated with specific change IDs. The knowledge 1202 may be a knowledge vector and represents the changes that the replica A 1200 is aware of. In one implementation of the present invention, versions or change IDs are maintained for items or objects in a database and the versions can be used to identify what needs to be replicated. Alternatively, a log of changes may also be maintained.

Figure 20:
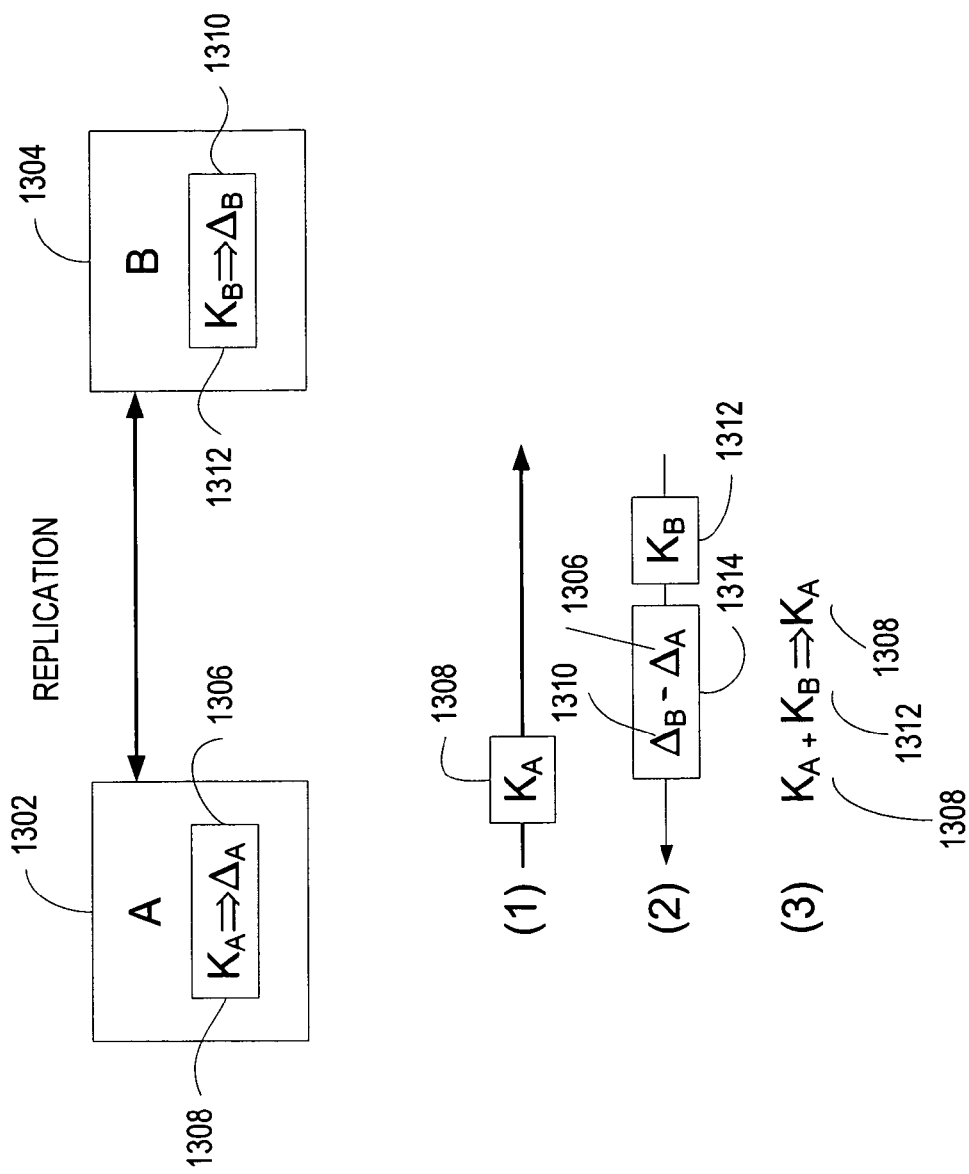
FIG. 20 illustrates one implementation of a timewise replication scenario between two participants.

FIG. 20 illustrates the use of knowledge to enumerate changes during replication. FIG. 20 shows two replicas, namely replica A 1302 and a replica B 1304. Replica A 1302 includes a set of changes 1306 in this example labeled $\Delta_A$. Replica A 1302 further includes knowledge 1308, in this example labeled $K_A$. The knowledge 1308 includes a list of change IDs such as those described above. Similarly, replica B 1304 includes a set of changes 1310 each associated with a version that is a change ID. To begin the replication, at time (1) replica A 1302 sends a synch request to replica B 1304 that includes the knowledge 1308. Replica B 1304, by comparing the knowledge 1308 to the versions associated with each of the changes in the set of changes 1310, can make decisions regarding which of replica B's changes 1310 replica A 1302 already has in its changes 1306 and changes about which replica A is aware of. Alternatively, the replica B 1304 compares the knowledge 1308 to the each item's version. Thus, replica B 1304 sends to replica A 1302 at time (2) only that portion of Replica B's changes 1310 that are associated with versions that are not included in the knowledge 1308 of replica A 1302 as illustrated by changes 1314. For example, if the knowledge vector of replica A was A3B12 and replica B has current changes associated with versions that are change IDs B13 and B14, then the changes sent to the replica A would include those associated with the change IDs B13 and B14. In one implementation, only B14 is sent if B13 and B14 were made to the same item.

In addition, replica B 1304 also sends replica B's knowledge 1312 to replica A 1302. Because replica B 1304 has sent all of the changes 1310 available in replica B 1304 not already in Replica A 1302 to replica A 1302, replica A 1302 now has all of the changes 1306 that were originally in replica A 1302, insofar as those changes 1310 have not been superceded by the changes sent by replica B 1304, in addition to the changes 1310 that were originally in replica B 1304. Replica A 1302 further has information about all of the changes that replica B 1304 was aware of. Therefore, replica A 1302 can update its knowledge 1308 to reflect the addition of the changes 1310. This is done simply by adding replica A's knowledge 1308 to replica B's knowledge 1312 and defining that value as replica A's knowledge 1308 such as is shown at time (3) in FIG. 20.

As such, an efficient replication is performed wherein only the needed changes are replicated and wherein the individual replicas replicating only need to maintain information regarding the changes that reside within the particular replica and previous changes about which it is aware of. While this example shows a complete replication of all of the changes on replica B to replica A, cases exist where only portions of the changes are replicated. As such, only change IDs that correspond to changes that are replicated are added to the knowledge of the replica receiving updates.

Figures 21, 22:
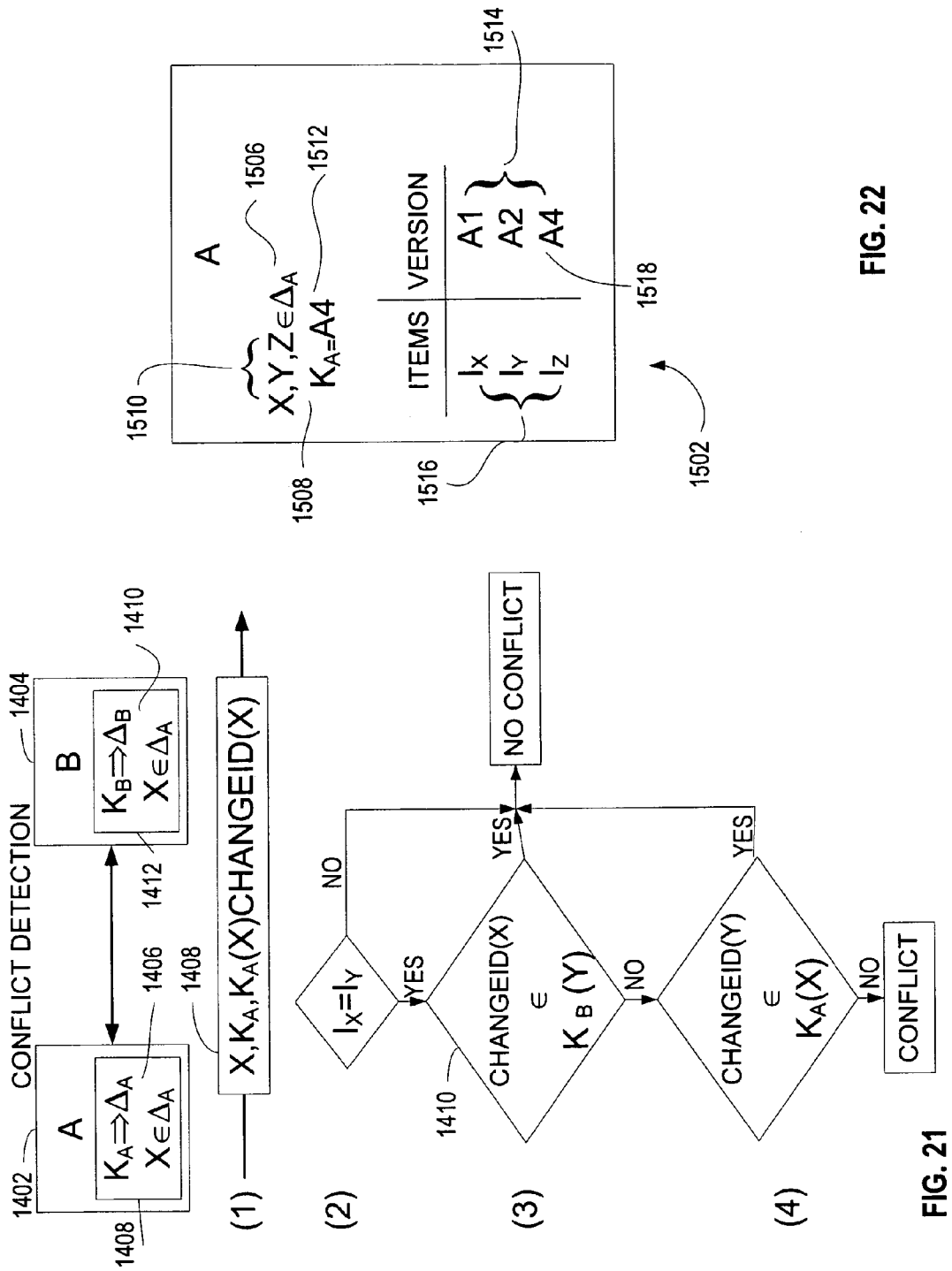
FIG. 21 illustrates one implementation of a timewise conflict detection scenario.
FIG. 22 illustrates an example of assigning change IDs to changes in a participant in one implementation.

In addition to enumerating changes, knowledge of a replica can also be used in conflict detection. Referring now to FIG. 21, one implementation of the present invention illustrates how conflict detection can be accomplished. FIG. 21 shows two replicas connected by an electronic link (wireless and/or wired) for communication and replication. Replica A 1402 includes knowledge 1408 and a set of changes 1406. As with the example in FIG. 20, the knowledge 1408 includes a collection of change IDs associated with the changes 1406 and associated with previous changes. Replica A 1402 further includes, for purposes of this example, a change to an item made in replica A 1402. The change is labeled X and X is a member of the changes 1406. Similarly, replica B 1404 includes knowledge 1412, a collection of items 1410, each with its current version (change ID). Illustratively, at time (1) replica A 1402 sends change X to replica B 1404.

Associated and sent with change X are two other values, namely the change ID associated with change X, labeled ChangeID(X), and a made-with-knowledge value, labeled $K_A(X)$. The made-with-knowledge value is the knowledge that existed in replica A 1402 at the time change X was made to replica A 1402. Alternatively, in some implementations of the invention the made-with-knowledge may be the knowledge that existed in a replica when a change is sent. Replica A's current knowledge 1408 may also be sent to replica B 1404. As shown in time (2), replica B 1404 compares the item changed by change X with the item changed by change Y to determine whether A's change (X) may conflict with B's state.

If the changes refer to different versions of the same item, then further analysis is required. Replica B 1404 then checks to see if change X was known to replica B 1404 when change Y was made in replica B 1404. Change Y has a change ID, ChangeID(Y) and a made-with-knowledge value, $K_B(Y)$, associated with it. If ChangeID(X) is a member of change Y's made-with-knowledge, $K_B(Y)$, then there is no conflict. In other words, change Y was made in replica B 1404 with knowledge of the change X made in Replica A 1402. As such, the change Y now represents the most current and valid data for the replicas A and B. Although not shown in the example illustrated by FIG. 21, at a subsequent time, change Y will likely be sent to replica A 1402 and the item associated with changes X and Y updated to change Y on the replica A 1402 in a fashion described in FIG. 20.

If the changes X and Y are for the same item, and ChangeID (X) does not appear in $K_B(Y)$, then as shown at time (4), a check is done to see if change Y was known by replica A 1402 when change X was made. This is typically done by checking to see if the change enumeration for change Y, illustrated as ChangeID(Y), is included in replica A's knowledge 1408 at the time change X was made, $K_A(X)$. If ChangeID(Y) is a member of $K_A(X)$, then change X was made-with-knowledge of change Y and there is no conflict. Change X is the most current and valid change for the particular item. As such, replica B 1404 will likely be updated with change X in a fashion as described in FIG. 20.

If the changes X and Y are for the same item, the ChangeID (Y) does not appear in $K_A(X)$ and ChangeID(X) does not appear in $K_B(Y)$, then a true conflict exists. In other words, change X and change Y were made independent of each other. In this case, a conflict will be reported and various conflict resolution rules may be applied to determine which change, X or Y, is the most current and valid change. Such rules may include checking time stamps to determine which change was made most recently, always resolving conflicts in favor of certain type of replicas (such as those stored on servers) and/or any other suitable conflict resolution. Alternatively, in one form of conflict resolution, an item with conflicting changes may be updated such that conflicting changes are merged to form a new change.

Referring now to FIG. 22, one exemplary implementation of Change IDs and knowledge tracking is shown. FIG. 22 shows a replica 1502. The replica 1502 includes a collection of changes 1506 and knowledge 1508. The collection of changes 1506 includes several individual changes 1510 in this example illustrated as X, Y and Z. In the example shown in FIG. 22, the present state of the knowledge of the replica is denoted by a knowledge vector 1512 that in this case is A4. The knowledge vector 1512 represents all of replica A's knowledge 1508.

Also represented in FIG. 22 is a number of change IDs 1514. In the example of FIG. 22, replica A 1502 includes three changed items 1516, $I_X$, $I_Y$, and $I_Z$, corresponding to the changes 1510. Using the change IDs, one can discern that the item $I_X$, with change ID A1, was made in replica A 1502 at a first time. Change $I_Y$, with change ID A2, was made in replica A 1502 at a time subsequent to the item $I_X$. And the item $I_Z$, with change ID A4, was made in replica A 1502 at a time subsequent to when the item $I_Y$ was made. A3, though not illustrated directly in FIG. 22, may correspond to a previous change such as in one example, a change that is superseded by the change to item $I_Z$ labeled A4.

There is a difference between the change ID A4 and replica A's knowledge vector 1512 that is also labeled A4. In this example, the knowledge vector A4 signifies that replica A's knowledge 1508 includes the changes corresponding to the change IDs labeled A4, A3, A2 and A1. Said differently, a knowledge vector includes the change represented by the change ID 1518 that is equal to the knowledge vector as well as all changes with the same replica ID that were made previous to the change ID 1518 represented in the knowledge vector. On the other hand, in the present example the change ID 1518 labeled A4 only represents the change Z made to item $I_Z$.

Figure 23:
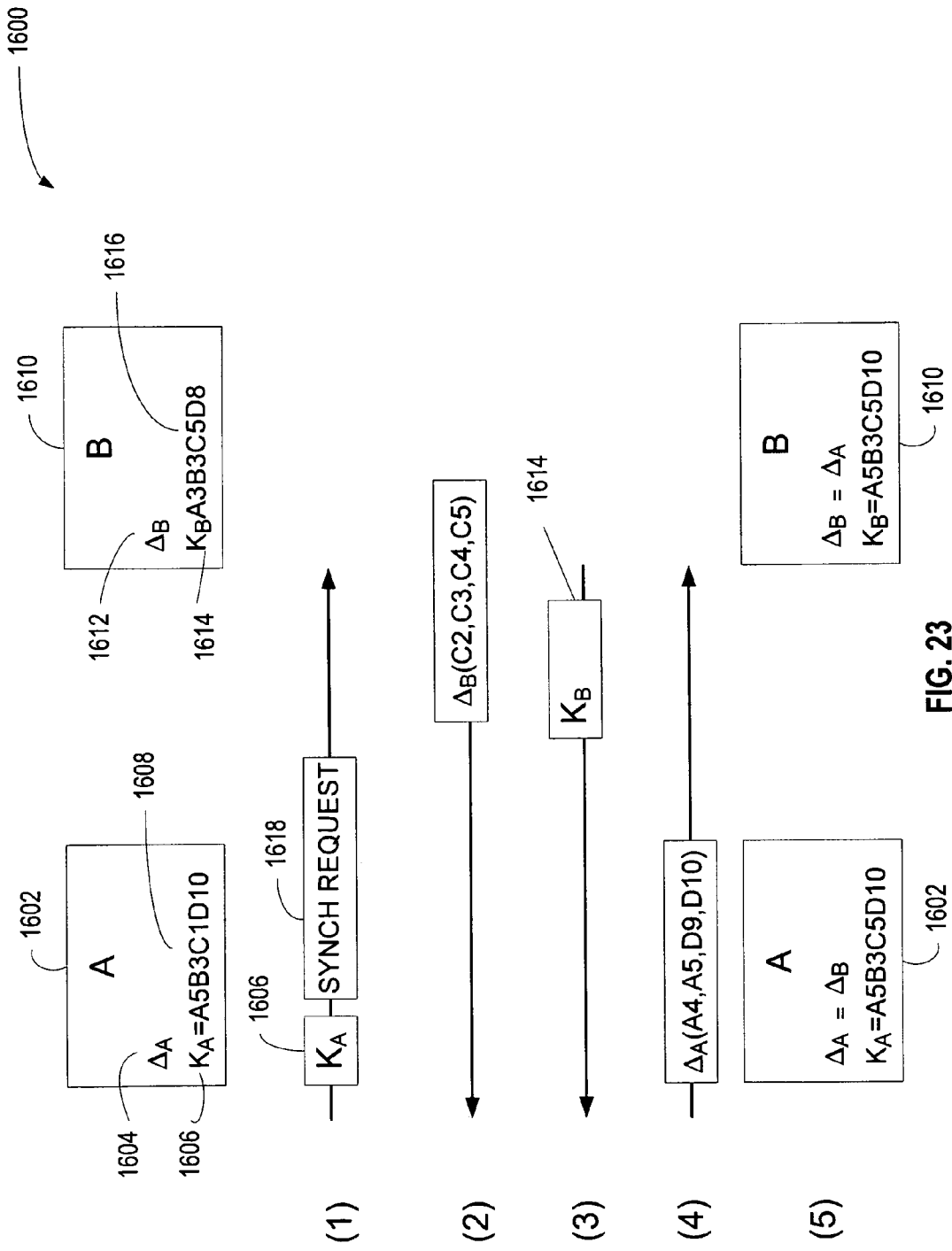
FIG. 23 illustrates one implementation of a timewise replication scenario using knowledge vectors.

Referring now to FIG. 23, an example of two replicas replicating in a topology containing a number of replicas is shown. Replica A 1602 contains a set of changes 1604, knowledge 1606 and a knowledge vector 1608 that is a short hand representation of the knowledge 1606. Illustratively, the knowledge vector 1608 of replica A 1602, A5B3C1D10, shows that replica A's knowledge 1606 includes changes made up to a fifth change in replica A 1602, knowledge up to a third change in a replica B 1610, knowledge up to a first change in a replica C and knowledge up to a tenth change in a replica D. Replica B 1610, in the example of FIG. 23, includes a set of changes 1612, knowledge 1614 and a knowledge vector 1616 that is a shorthand representation of replica B's knowledge 1614. Replica B's knowledge vector 1616, A3B3C5D8, illustrates that replica B has knowledge including knowledge up to a third change made by replica A 1602, knowledge up to a third change made by replica B 1610, knowledge up to a fifth change made by replica C and knowledge up to an eighth change made by replica D. The knowledge vectors set forth above include a continuous representation of change enumerations made by a replica from a first change to some subsequent change. As will explained in more detail later herein, a knowledge vector may also include a beginning point that is some other change enumeration than the first change enumeration made by a replica.

A time wise illustration of the replication of replica A 1602 with replica B 1610 is illustrated in FIG. 23. At time (1), replica A 1602 sends a synch request 1618 along with replica A's knowledge 1606, that may be represented by replica A's knowledge vector 1608, to replica B 1610. Replica B 1610 at time (2) examines replica A's knowledge 1606 by comparing it to change IDs associated with the changes in Replica B. Replica B 1610 discovers that replica A is not aware of changes made by replica C that are labeled with the change IDs C2, C3, C4 and C5. Thus, replica B sends replica B's changes 1612 corresponding to these change IDs so long as the changes labeled with those change IDs are the current changes applicable to items in Replica B 1610. If a change ID corresponds to a previous outdated change, no change corresponding to that ID is sent. For example, if an item that had a version C3 was updated and assigned a new version, the change associated with C3 no longer exists in replica B 1610 and is not sent to replica A. Subsequently or simultaneously as illustrated in time (3) replica B 1610 sends to replica A 1602 replica B's knowledge 1614 that may be represented as a knowledge vector 1616.

At time (4) replica A 1602 examines the knowledge 1614 sent by replica B by comparing it to the change ID's corresponding to changes in replica A 1602. Replica A 1602 discovers that replica B does not have either the changes represented by the change IDs A4, A5, D9 and D10, or knowledge about those changes. Thus, replica A 1602 sends any current changes existing in replica A's changes 1604 corresponding to those change IDs (except when the change ID represents an outdated change such that no change is sent). Replica A 1602 may subsequently send a message to replica B 1610 indicating that all changes have been sent such that replica A 1602 and replica B 1610 can now update their knowledge vectors 1608 and 1616 respectively to include the recently replicated changes. As shown in FIG. 23 at time (5), replica A's knowledge vector, A5B3C5D10, is equal to replica B's knowledge vector which includes all changes made by replica A up to a fifth change enumeration, all changes made by replica B up to a third change enumeration, all changes made by replica C up to a fifth change enumeration and all changes made by replica D up to a tenth change enumeration.

Referring now FIGS. 24A and 24B, two methods of updating the knowledge vectors following a complete replication such as that represented in FIG. 23 are shown. Specifically, FIG. 24A illustrates a method for updating the knowledge vectors using an exception list 1702 stored on a replica. To create an exception list 1702, as changes are sent between replicas, the changes are sent with a change ID associated with the change. When the change is added to a replica, the change ID is added as an exception to an exception list 1702. Examining now the knowledge for replica A in FIG. 24A; the knowledge includes a knowledge vector 1608 and an exception list 1702 which includes the exceptions C2, C3, C4 and C5. An examination of the exception list 1702 in conjunction with the knowledge vector 1608 reveals that including the change IDs from the exception list 1702, the knowledge of Replica A includes all changes up to a fifth change made by replica C. Thus, the exceptions can be removed from the knowledge of Replica A 1602 and the knowledge vector updated to include an element C5 as shown in the updated knowledge vector 1704. A similar analysis can be performed on the knowledge 1614 of replica B 1610. The original knowledge vector 1616 combined with the exceptions A4, A5, D9 and D10 in the exception list 1703 allows the knowledge vector 1616 to be updated to an updated knowledge vector 1706.

Notably, if only a partial replication was performed, such as for example if the changes corresponding to the change IDs A4 and D9 were not sent in a replication such as that represented by FIG. 23, then the knowledge 1614 of replica B 1610 would need to maintain the exceptions A5 and D10 until a subsequent replication with another replica that transfers the changes represented by the change IDs A4 and D9 to replica B 1610.

FIG. 24B illustrates another method of updating the knowledge vectors 1608 and 1616 to reflect the replication shown in FIG. 23. In this example, the knowledge vectors are updated using an element-wise maximum for each of the elements in the original knowledge vectors 1608 and 1616 to form an updated knowledge vector 1708. The first element of each of the knowledge vectors 1608 and 1616 corresponds to a set of change IDs labeling changes made in replica A. Because A5 is the element-wise maximum element of the two knowledge vectors 1608 and 1616, the updated knowledge vector 1708 includes an element A5. Likewise, the vector elements B3, C5 and D10 each represent an element-wise maximum element corresponding to the changes on the particular replicas to which each of the elements correspond. Examination of each of the updated knowledge vectors 1704, 1706 and 1708 reveals that by either method, the same updated knowledge vector is obtained. The element-wise maximum method of knowledge vector updating is typically used when a complete replication has been performed whereas as an exception list method of updating the knowledge vector may be useful when it is not certain that a complete replication has occurred (a user may cancel the replication, a device may crash, etc.). Namely, the exception list method may need to be used such that exceptions can continue to comprise a portion of the knowledge of a particular replica when the full knowledge of the replica cannot be represented in simple vector form.

Referring now to FIG. 24C, an example of updating knowledge is shown for a replica that has information from an incomplete replication. FIG. 24C includes an original knowledge vector 1710, an original exception list 1712, an updated knowledge vector 1714, and an updated exception list 1716. With regard to the replica shown, after the partial replication, the replica has all of the change IDs labeled A1 through A5, represented by the vector element A5, and all of the change IDs labeled A7 through A10 represented by the list of exceptions including A7, A8, A9 and A10. As shown in FIG. 24C, in an updated version of the knowledge, the updated exception list 1716 can be shortened to indicate inclusion of all elements from A7 to A10 such as by the expression (A7:A10) shown in FIG. 24C. This expression is simply a vector such as those that have been previously discussed herein except that the beginning point of the vector is some other point than the first change enumeration for replica A. Thus the representation of the replica's knowledge as it relates to A is represented by the vector element A5 and the exception vector (A7:A10).

In the case of the knowledge of the replica regarding replica B, the knowledge vector 1710 can be updated to include the continuous change IDs subsequent to the change IDs included in the vector element for replica B. The vector element B1 includes only the change ID B1. Because change IDs B2, B3 and B4 exist in the exception list 1712, and they are continuous with the change ID B1 included in the knowledge vector 1710, the vector element for replica B can be updated to B4 in the updated knowledge vector 1714 which represents the inclusion of elements B1 through B4. Because the change ID B5 is missing from the exception list, the exception B6 must remain in the exception list 1716 in the updated knowledge.

A similar analysis can be performed regarding the replica of FIG. 24C's knowledge regarding changes made by replica C. The original knowledge vector 1710 includes C5. The original exception list includes C6, C7 and C8. Because the original knowledge vector element C5 includes change IDs C1 through C5, and C5 is continuous with the change IDs in the original exception list 1712, the updated knowledge vector element for replica C can be updated to C8.

Figure 25:
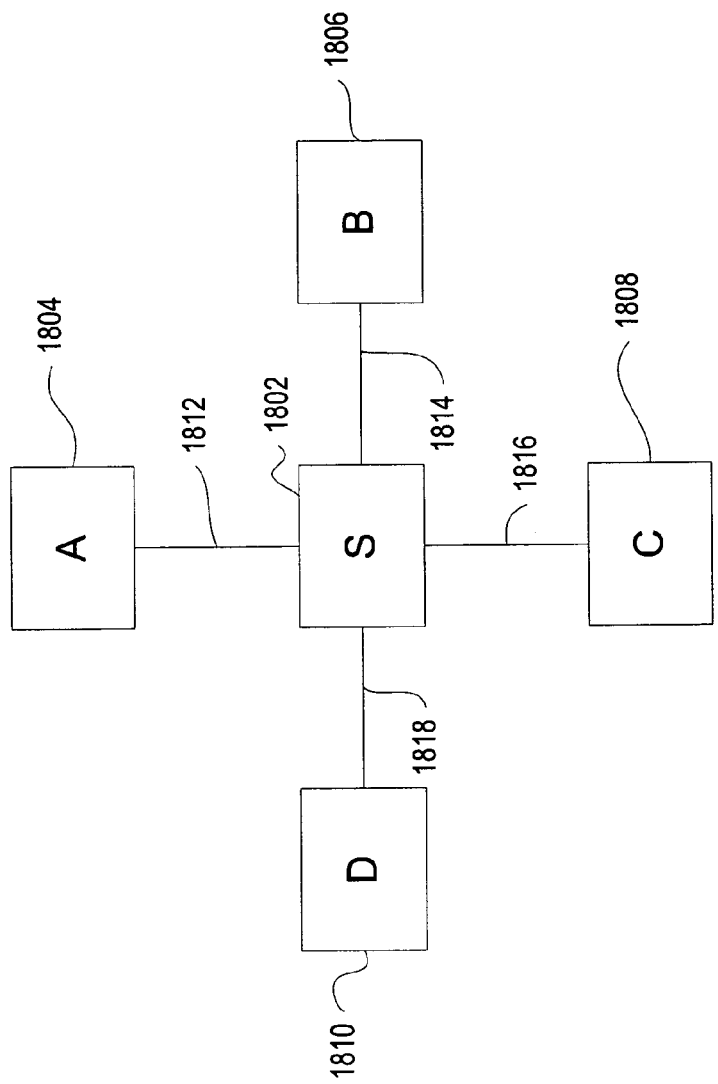
FIG. 25 illustrates a hub-and-spoke topology of one implementation for implementing replication including surrogate replication.

One challenge that may arise with respect to the size of knowledge vectors is especially prevalent when the number of replicas in a sync community is great. In a topology where the knowledge vector includes a change ID or other vector element for each and every replica within the sync community, the knowledge vector increases with each replica that is added to the sync community. One optimization is to recognize that in some sync communities not every replica needs to be represented in the knowledge vector. One illustration of such a case is the sync community shown in FIG. 25 which represents a hub and spoke server topology. FIG. 25 shows a server 1802 connected to a number of clients including replica A 1804 replica B 1806 replica C 1808 and replica D 1810. In this example, all replication paths 1812-1818 between the clients are through the server 1802 and thus the server 1802 can assign a change ID that includes the server 1802 as the replica ID. All changes made within the individual clients 1804 through 1810 remain within the respective client in which the change was made without the assignment of a change ID until a replication is performed. Thus, in this example, the knowledge vector includes a single element that comprises the replica ID and change ID of the server 1802. Illustratively, if a change is made in replica A 1804 and replicated with the server 1802 at a first time, the server 1802 assigns a change enumeration of S1 to the change. At a subsequent time, a change made in replica B 1806 is replicated with the server 1802. This change is assigned a change enumeration by the server of S2. Notably, while in this example, the server 1802 assigns all change enumerations, other implementations may exist where the server 1802 assigns some change enumerations and other replicas assign other change enumerations.

Implementations of the invention are adaptable to optimize the knowledge vector in other topologies as well. For example, in FIG. 18, replica D 1114 only replicates with replica C 1110. Thus, changes made by C and D can be enumerated using change enumerations that have a single replica ID. In one example, if the replica ID of replica C is chosen to be part of the change enumeration for all changes by either replica C 1110 or replica D 1114, a first change in replica C would be labeled with the change enumeration C1. A subsequent change in replica D 1114 is labeled C2, and so forth. When one replica creates a change ID for changes made on a different replica, the replica creating the change ID may be referred to as a surrogate author.

By optimizing the knowledge vector for the particular topology or sync community, resources used for storing the knowledge vector can be conserved in topologies that approach hub and spoke server-client topologies such as that shown in FIG. 25. In topologies more like peer-to-peer networks, a larger knowledge vector is required, but the individual replicas can effectively and independently replicate with a larger number of other replicas while avoiding problems such as synch loops, false conflicts, and the like.

When different replicas are allowed to make changes to items independent of one another, conflicts between the independently made changes may result that should be resolved. Conflict resolution typically requires that there be certain rules for determining which item version should be chosen as the valid item. Examples of some of these rules include selecting the item change that was made last or selecting item changes that are made by particular types of replicas such as preferring changes made by servers over changes made by other types of replicas. Alternatively, all conflicts could be logged for manual resolution. Manual resolution is accomplished by a user providing a new value for the item in conflict that will replace the conflicting changes.

Figures 26A, 26B:
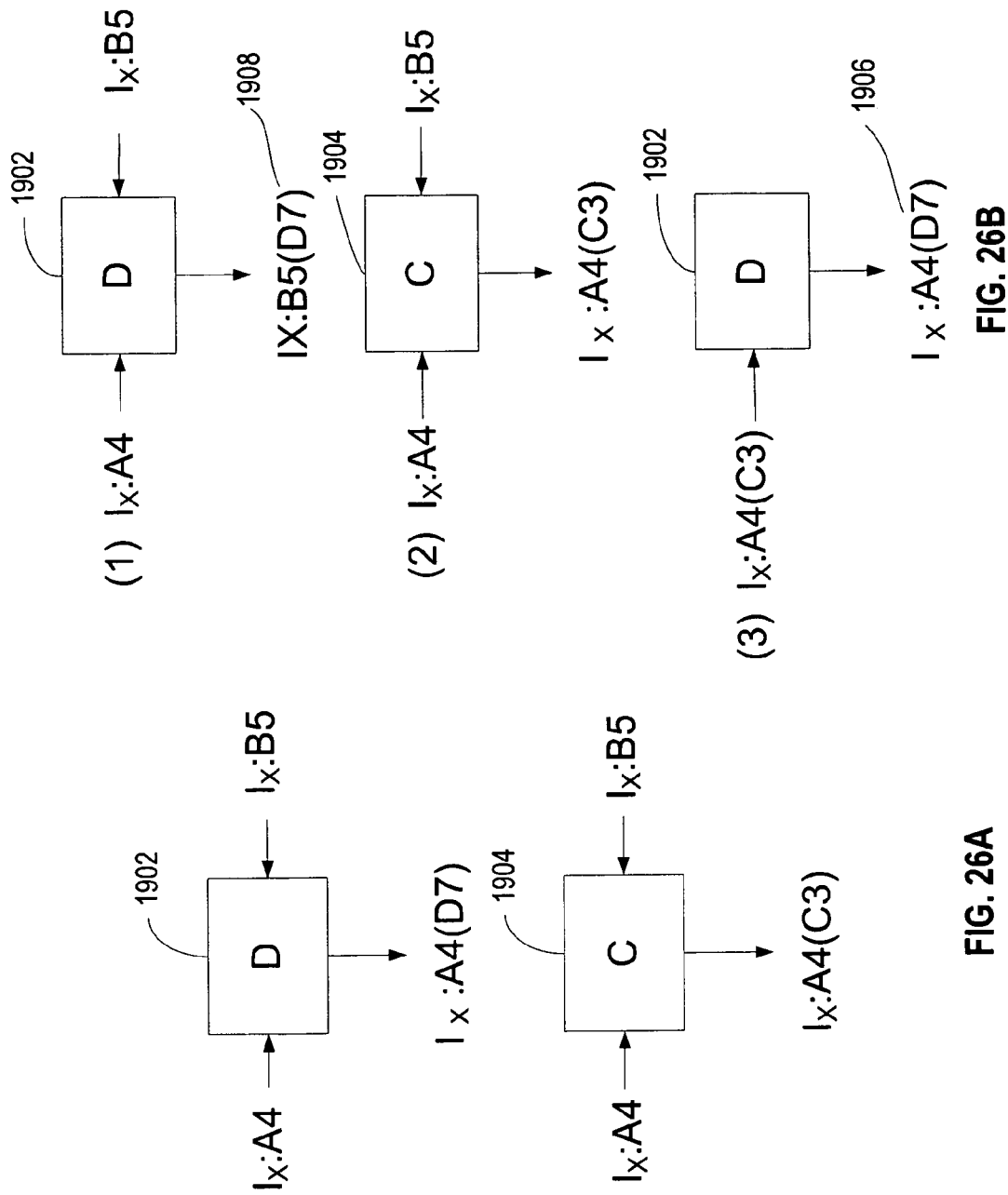
FIG. 26A illustrates examples of conflict resolution scenarios in one implementation.
FIG. 26B illustrates other conflict resolution scenarios in one implementation.

If all replicas within a sync community or topology resolve conflicts in the same way, no other resolution rules or resolution systems are typically required as all replicas within the system will migrate to a replicated resolution of any conflicts. While the replicas within the sync community may not be specifically designed to resolve conflicts in exactly the same way, the replicas within a sync community may nonetheless resolve conflicts in exactly the same way. Such an example of this is shown in FIG. 26A. FIG. 26A shows a replica D 1902. Replica D 1902 receives a change ID corresponding to a change in an item $I_x$ wherein the change ID is A4. Subsequently replica D 1902 receives a change ID for the same item $I_x$ wherein the change ID is B5. Replica D 1902 has conflict resolution rules to choose which of the changes to item $I_x$ is the preferred change. In this case replica D chooses the change to item $I_x$ labeled by the change ID A4. To indicate that a conflict was resolved by replica D 1902 and how the conflict was resolved, a new change ID is assigned to the item $I_x$ that includes both the results of the conflict resolution and a new change ID assigned by the particular replica that made the conflict resolution. The new change ID includes the next sequential change enumeration for the replica that made the conflict resolution. In this case, the new change ID is labeled A4 (D7) to indicate that the change labeled A4 was chosen in the conflict resolution and that the conflict was resolved by replica D 1902. As shown in FIG. 26A, a similar process occurs when a conflict in changes is detected by a replica C

1904. Replica C 1904 resolves the conflict in the same manner as replica D 1902. Thus a new change ID labeled A4 (C3) is assigned to the change of the item $I_x$. In this case, the conflict between the changes to item $I_x$ labeled with the change IDs A4 and B5 will eventually be resolved in the same way in all of the replicas within the topology.

FIG. 26B illustrates an example where conflicts are resolved differently by different replicas within a topology. In FIG. 26B, at time (1) replica D 1902 resolves the conflict in one way and assigns a new change ID to the items that illustrate the resolution of the conflict, B5, and the replica that that made the change, (D7). At time (2) replica C 1904 resolves the same conflict in a different way shown by the new change ID assigned by replica C 1904, A4 (C3). At time (3), replica D 1902 receives replica C's resolution of the conflict. Replica D 1902 at this point recognizes that this particular conflict has been resolved in two different ways. Some implementations of the present invention therefore specify that a deterministic resolution be made between the conflicting changes to the item $I_x$. The particular deterministic resolution illustrated by FIG. 26B causes the change with the lowest value replica ID to be selected as the deterministic result. Thus, because A is a lower value replica ID than replica B the deterministic resolution of the conflict is selected to be the change labeled by the change ID A4. Replica D 1902 thus changes the change ID associated with the change to item I to be A4 (D7). Note that to avoid replication loops or other conflict problems the change enumeration (i.e. D7) associated with the replica making the change is the same in the deterministic result 1906 as in the original resolution of the conflict 1908.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for synchronizing data comprising the steps of:

providing a partial participant, the partial participant having a data store and a knowledge store, the data store storing a set of data retrieved during a synchronization process with a first full participant, the knowledge store storing a set of knowledge about the data in the data store, wherein the set of knowledge represents changes to the data that the first full participant is aware of, wherein the partial participant does not understand the set of knowledge, and wherein the partial participant is responsible for tracking what changes the partial participant makes to the set of data in the data store, wherein the knowledge is stored as a vector pair that represents a participant identifier and a sequence identifier of a last change the partial participant has seen for a device associated with the participant identifier;

receiving a request from a user of the partial participant to change a particular record in the set of data in the data store; and updating the particular record in the data store upon receiving the request from the user, wherein the updating includes storing information identifying a source of the change as the partial participant.

2. The method of claim 1, wherein the partial participant is operable to synchronize with a second full participant.

3. The method of claim 1, wherein the partial participant is synchronized with the first full participant through a handler on the first full participant.

4. The method of claim 1, wherein the first full participant is a personal computer.

5. The method of claim 1, wherein the set of knowledge comprises metadata that describes a last change the partial participant has seen for another participant.

6. The method of claim 1, wherein the partial participant is a web service.

7. The method of claim 1, wherein the information identifying the source of the change is a version.

8. The method of claim 7, wherein a first portion of the version includes an identifier that uniquely identifies the partial participant and wherein a second portion of the version includes a number that indicates a record version.

9. The method of claim 1, wherein the information identifying the source of the change is a unique identifier for the record and a date and time identifier to indicate when the record changed.

10. The method of claim 1, further comprising:
receiving an updated set of knowledge from the first full participant after the first full participant updates the set of knowledge after the synchronization process.

11. A computer-readable storage medium having computer-executable instructions for causing a computer to perform the steps recited in claim 1.

12. A computer-readable storage medium having computer-executable instructions for causing a computer to perform steps comprising:
receive a request from a participant to perform a synchronization operation using a synchronization engine;
determine a type for the participant, the type being selected from the group consisting of a full participant type, a partial participant type, and a simple participant type;
wherein the participant is determined to be the simple participant type if it has a simple participant data store and no knowledge;
wherein the participant is determined to be the partial participant type if it has a partial participant data store and stored-but-not-understood knowledge;
wherein the participant is determined to be the full participant type if it has a full participant data store and stored-and-understood knowledge; and
wherein the synchronization engine performs the synchronization operation with the participant using a set of logic that is appropriate for the type of participant, wherein the knowledge is stored as a vector pair that represents a participant identifier and a sequence identifier of a last change partial participant has seen for a device associated with the participant identifier.

13. The computer-readable storage medium of claim 12, wherein if the type for the participant is determined to be the simple participant type, then the synchronization engine is operable to synchronize a set of data in the simple participant data store by detecting changes to the set of data in the simple participant data store and storing any conflicts in a local data store.

14. The computer-readable storage medium of claim 12, if the type for the participant is determined to be the partial participant type, then the synchronization engine receives the stored-but-not-understood knowledge from the participant and updates the stored-but-not-understood knowledge on the participant if exceptions occur.

15. The computer-readable storage medium of claim 14, wherein the synchronization engine updates the stored-but-not-understood knowledge on the participant by modifying a local copy and then transferring the local copy to the participant.

16. The computer-readable storage medium of claim 12, wherein if the type for the participant is determined to be the partial participant type, then the participant is operable to participate in a multi-master two-way synchronization operation because of the stored-but-not-understood knowledge on the participant.

17. The computer-readable storage medium of claim 12, wherein the synchronization engine receives a request from the participant to register a handler for the synchronization operation.

18. A method for synchronizing data comprising the steps of:
providing a simple participant, the simple participant having a data store and no knowledge store, the data store being operable to store a set of data provided during a synchronization process with a full participant, and wherein the simple participant is not responsible for tracking what changes the simple participant makes to the set of data in the data store;
receiving a request from a user of the simple participant to change a particular record in the set of data in the data store;
updating the particular record in the data store upon receiving the request from the user;
during synchronization with a full participant, the full participant retrieves changes to the particular record in the data store; and
during synchronization with the full participant, the full participant resolves any conflicts and then updates the data store of the simple participant, wherein the knowledge is stored by the full participant as a vector pair that represents a participant identifier and a sequence identifier of a last change the partial participant has seen for a device associated with the participant identifier.

19. A computer-readable storage medium having computer-executable instructions for causing a computer to perform the steps recited in claim 18.

* * * * *